US006598137B1

(12) United States Patent
Yaegawa et al.

(10) Patent No.: US 6,598,137 B1
(45) Date of Patent: Jul. 22, 2003

(54) MICROCOMPUTER HAVING BUILT-IN NONVOLATILE MEMORY FOR SIMULTANEOUS USE AS A PROGRAM AREA AND A DATA AREA

(75) Inventors: Kazuhiro Yaegawa, Yamatokoriyama (JP); Ryuichi Ogawa, Ikoma-gun (JP); Tadao Takeda, Ebina (JP); Hiroki Suto, Isehara (JP); Masaaki Tanno, Hadano (JP)

(73) Assignees: Sharp Kabushiki Kaisha, Osaka (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/541,086

(22) Filed: Mar. 31, 2000

(30) Foreign Application Priority Data

Apr. 2, 1999 (JP) ............................................ 11-096864

(51) Int. Cl.⁷ .............................................. G06F 12/00
(52) U.S. Cl. ....................................... 711/165; 711/155
(58) Field of Search ................................ 711/165, 155; 710/260; 712/244; 713/1, 2

(56) References Cited

U.S. PATENT DOCUMENTS

| | | | |
|---|---|---|---|
| 4,698,750 A | * 10/1987 | Wilkie et al. | 365/185.04 |
| 5,187,792 A | * 2/1993 | Dayan et al. | 713/2 |
| 5,522,076 A | * 5/1996 | Dewa et al. | 713/2 |
| 5,574,926 A | * 11/1996 | Miyazawa et al. | 711/103 |
| 5,579,522 A | 11/1996 | Christeson et al. | 395/652 |
| 5,844,843 A | * 12/1998 | Matsubara et al. | 365/185.24 |
| 5,881,295 A | 3/1999 | Iwata | 395/735 |
| 6,018,629 A | * 1/2000 | Tojima | 717/173 |
| 6,154,837 A | * 11/2000 | Fudeyasu et al. | 713/2 |
| 6,308,265 B1 | * 10/2001 | Miller | 710/10 |
| 6,434,695 B1 | * 8/2002 | Esfahani et al. | 713/2 |
| 6,457,175 B1 | * 9/2002 | Lerche | 717/173 |

FOREIGN PATENT DOCUMENTS

| | | | |
|---|---|---|---|
| EP | 0 524 719 A2 | 1/1993 | ............ G06F/9/44 |
| EP | 0 536 793 A2 | 4/1993 | ........... G06F/9/445 |
| EP | 0858040 A2 * | 8/1998 | ........... G06F/15/78 |
| JP | 5-342374 | 12/1993 | ........... G06F/15/78 |
| JP | 08-101794 | 4/1996 | ............ G06F/9/06 |
| JP | 8-278895 | 10/1996 | ............ G06F/9/46 |
| KR | 1998-071069 | 10/1998 | ........... G06F/15/00 |

OTHER PUBLICATIONS

IBM Technical Disclosure Bulletin, "Microcode Program Debugger for an Adapter Card," pp41–48, vol. 31, Issue No. 6, 1988.*
Hamacher et al., "Computer Organization, $2^{nd}$ Edition," pp 180–183, 1984.*
Norton, "Peter Norton's Inside the PC, Premier Edition," Sams Publishing, pp. 155–160, 1995.*
"Designing an updateable BIOS using flash memory" –by Brian Dipert and Don Verner, Microprocessors and Microsystems –vol. 16, No. 8, 1992 pp. 427–446.

* cited by examiner

*Primary Examiner*—Matthew Kim
*Assistant Examiner*—Stephen Elmore
(74) *Attorney, Agent, or Firm*—Birch, Stewart, Kolasch & Birch, LLP

(57) ABSTRACT

A 1-chip microcomputer having a built-in nonvolatile memory includes at least one erasable flash memory provided in a memory space of the microcomputer, a boot ROM for storing an initial program to start up the 1-chip microcomputer and a transfer program to transfer the initial program to the flash memory, and control means for, when the flash memory stores no program, transferring the initial program to the flash memory in accordance with the transfer program and subsequently removing the boot ROM from the memory space. Consequently, even if a new program is additionally stored to the nonvolatile memory in the 1-chip microcomputer, the additional program can be carried out.

20 Claims, 18 Drawing Sheets

F I G. 1 5 (a)
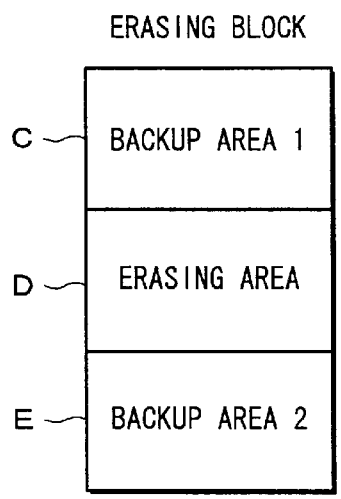
SEQUENCE 1
(COMPUTE BACKUP
AREAS)
SEQUENCE 1
(SAVE DATA IN
BACKUP AREAS)
F I G. 1 5 (b)
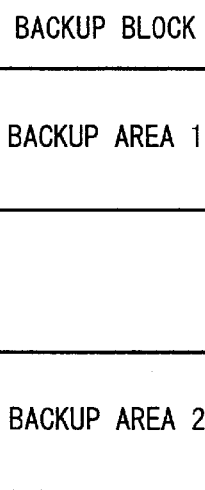
SEQUENCE 2
(ERASE DATA IN
ERASING BLOCK
COMPLETELY)
F I G. 1 5 (c)
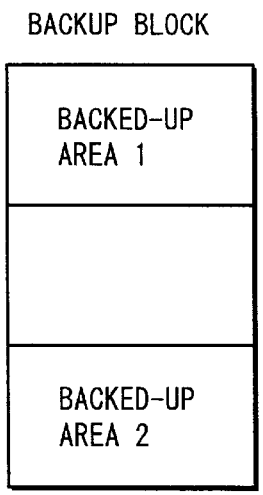
SEQUENCE 3
(RESTORE BACKUP
AREAS)
F I G. 1 5 (d)
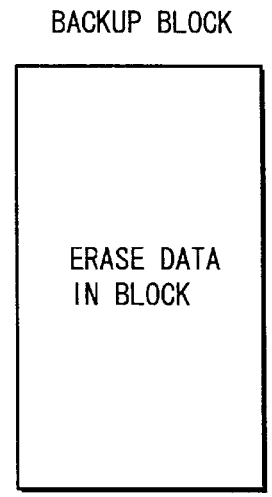
SEQUENCE 4
(ERASE DATA IN
BACKUP BLOCK
COMPLETELY)

MICROCOMPUTER HAVING BUILT-IN NONVOLATILE MEMORY FOR SIMULTANEOUS USE AS A PROGRAM AREA AND A DATA AREA

FIELD OF THE INVENTION

The present invention relates to a microcomputer having a built-in erasable nonvolatile memory, such as EEPROMs, flash memories, and FeRAMs.

BACKGROUND OF THE INVENTION

As an example of a microcomputer having a built-in nonvolatile memory, a 1-chip microcomputer having a built-in EEPROM has been known, and this type of microcomputer has been used extensively as IC cards. FIG. 16 shows an example memory map of the 1-chip microcomputer used as the IC card.

In this memory map, addresses 0000H–7FFFH are allocated to a 32-kbyte ROM (Read Only Memory) area; addresses 8000H–9FFFH to an 8-kbyte EEPROM area; and addresses FF00H–FFFFH to a 256-byte RAM area.

To address 0000H is a start address, and the addresses 0000H–000FH are allocated to an interrupt vector. The 1-chip microcomputer is arranged in such a manner that a program branches to a ROM's head address whenever the 1-chip microcomputer completes a reset action, and to a ROM's interrupt routine area whenever an interrupt occurs. In other words, the 1-chip microcomputer reads out a program from the ROM's head address at start-up. Interrupt routines are frequently carried out while a program is run, and the program has to return to the ROM's interrupt routine area for each interrupt routine. Thus, in this 1-chip microcomputer, the program should be on the ROM area before it is run. Here, the EEPROM area is used either as a data area or a program area.

On the other hand, 1-chip microcomputers having nonvolatile memories other than EEPROM's, that is, those having built-in flash memories have also been on the market. FIG. 17 shows an example memory map of the 1-chip microcomputer having a built-in flash memory.

In this memory map, addresses 0000H–7FFFH are allocated to a 32-kbyte flash memory area, and addresses FF00H–FFFFH to a 256-byte RAM (Random Access Memory) area.

Like the 1-chip microcomputer of FIG. 16 having a built-in EEPROM and used as the IC card, the address 0000H is a start address, and the addresses 0000H–000FH are allocated to an interrupt vector. The flash memory is divided into eight (8) blocks (BLOCKs 0–7) for every 4 kbytes, and data can be erased collectively per block. With this 1-chip microcomputer, the flash memory serving as a nonvolatile memory is provided on the assumption that the entire area is used as a program area. In other words, the flash memory is provided on the precondition that, while the program stored in the flash memory is run, neither can data be written into nor erased from the flash memory.

In order to write a program into the flash memory of the 1-chip microcomputer, the following methods can be adopted.

A first method uses a general PROM writer. In this method, generally, a device equipped with the 1-chip microcomputer is inserted into a socket of the PROM writer through a socket adapter, and data is written directly into the flash memory through an external terminal of the 1-chip microcomputer.

A second method is a popular method, by which data is written into the flash memory by means of a serial communication interface (hereinafter, referred to as SCI) furnished in the 1-chip microcomputer.

FIG. 18 shows an arrangement to carry out the second method. In the drawing, the 1-chip microcomputer 101 is connected to a personal computer 103 through a converting board 102. A writing program code stored in the personal computer 103 is transferred to the converting board 102 via a data line 104, and taken into an SCI 106 in the 1-chip microcomputer 101 from the converting board 102 via a serial data line 105. The program code is sent to a flash memory 108 from the SCI 106 via an internal bus 107 and written therein. A CPU 109 controls the flash memory 108, and the control program is stored in either a ROM 110 or a RAM 111.

In case of the 1-chip microcomputer of FIG. 16 used as the IC card, however, the EEPROM is mainly used for data storage. Thus, most of the program is stored in the non-erasable ROM and only a part thereof is stored in the EEPROM. Because the program stored in the ROM can not be overwritten, it can not be modified significantly. In particular, if the OS or the like of the IC card is stored in the ROM, upgrading the OS or the like is almost impossible.

Multi-application IC cards have been proposed recently, but if they contain the above-arranged 1-chip microcomputers, it is also impossible to additionally write other application programs once the IC card is issued.

Further, when a program different from the one stored in the ROM is additionally stored in the EEPROM so as to use this EEPROM as a data area in accordance with the additionally stored program, the program has to branch to the ROM before the job is started as previously mentioned. This is because, if the memory device (EEPROM) is seen from the CPU end, the same hardware address is assigned to the memory device for execution of both data read-out and data writing actions, but data read-out and data writing actions can not be executed simultaneously at the same address. Also, because the access program stored in the EEPROM as the additional program can not be transferred to the ROM to be stored therein, the access program already stored in the ROM can not be modified as desired. Thus, the program already stored in the ROM, namely a writing/erasing routine, is also used in this case, and therefore, data can not be written into or erased from the EEPROM in accordance with the additional program stored therein.

On the other hand, in case of the 1-chip microcomputer having a built-in flash memory, the flash memory is provided on the provision that it is replaced with a program ROM. Therefore, it is quite difficult to use the same flash memory as the program area and also as the data area simultaneously.

In case that the flash memory is used instead of the ROM, that is, the ROM is omitted, if a program is transferred to the RAM and stored therein, data can be written into/erased from the flash memory. However, if the program is merely transferred to the RAM as described above to use a part of the flash memory as a data area, the following problem occurs.

That is, if an interrupt request signal is generated from another block (for example, if an interrupt request signal 112 is generated from the SCI 106 in FIG. 18) when a program is transferred to the RAM from the flash memory and data is written into/erased from the data area in the flash memory in accordance with the program on the RAM, the program branches to the interrupt vector on the flash memory. However, because the data is being written into/erased from the flash memory, the interrupt vector can not be read out, and the system runs away out of control. In particular, this problem becomes apparent when nonvolatile memories including flash memories, etc. are used, because the nonvolatile memories require writing time and erasing time far longer than the CPU's writing and read-out cycle. This problem invariably occurs with any kind of nonvolatile memories (including FeRAM) unless the writing and erasing cycle is matched with the CPU's cycle. Thus, with the conventional 1-chip microcomputer having a built-in flash memory, it is quite difficult to use the same flash memory as the program area and also as the data area simultaneously.

Japanese Laid-open Patent Application No. 278895/1996 (Japanese Official Gazette, Tokukaihei No. 8-278895, publishing date: Oct. 22, 1996) discloses a 1-chip microcomputer having a built-in nonvolatile memory, which is arranged in such a manner so as to avoid the run away of the system when an interrupt occurs while data is being written into/erased from the flash memory by automatically making the interrupt vector jump to the RAM or any other memory.

However, this invention is directed to a technique to stabilize the system when external data is written into the general microcomputer having a built-in flash memory. In other words, this invention is silent about an arrangement to effect the data writing/erasing action with respect to the data area in the flash memory in accordance with the program stored in the same flash memory.

Also, in order to activate the function furnished with the arrangement of the above invention, the microcomputer has to be set to a mode different from a normal user mode. This is not preferable as an arrangement to solve the above problem.

Japanese Laid-open Patent Application No. 342374/1993 (Japanese Official Gazette, Tokukaihei No. 5-342374, publishing date: Dec. 24, 1993) discloses a technique to download a program in the initial stage. This invention relates to a technique to download program data into the microcomputer having a built-in flash memory, and like the foregoing prior art invention, the microcomputer has to be set to a mode different from a normal user mode. In other words, if this function is used in the normal mode, an interrupt routine can not be modified as desired in the user program (a program added arbitrarily by the user) because the interrupt vector is in a boot ROM.

SUMMARY OF THE INVENTION

The present invention is devised to solve the above problems, and therefore, has an object to provide a microcomputer having a built-in nonvolatile memory which can carry out a program additionally stored in the nonvolatile memory.

The present invention has another object to provide a microcomputer having a built-in nonvolatile memory, in which a nonvolatile memory can be also used as a data area in accordance with a program additionally stored in the same nonvolatile memory, in other words, the nonvolatile memory can be used as a program area and also as a data area simultaneously.

In order to fulfill the above and other objects, a microcomputer having a built-in nonvolatile memory of the present invention is characterized by being furnished with:

at least one erasable nonvolatile memory provided in a memory space of the microcomputer;

a boot ROM for storing an initial program to start up the microcomputer and a transfer program to transfer the initial program to the non-volatile memory; and a control section for, when the nonvolatile memory stores no program, transferring the initial program to the nonvolatile memory in accordance with the transfer program, and subsequently removing the boot ROM from the memory space of the microcomputer.

According to the above arrangement, when the nonvolatile memory stores no program, the control section transfers the initial program stored in the boot ROM to the nonvolatile memory in accordance with the transfer program stored in the boot ROM, and stores the transferred program in the nonvolatile memory. Then, the control section removes the boot ROM from the memory space of the microcomputer.

Consequently, the initial program can be readily transferred to and then stored in the nonvolatile memory in the state same as immediately after the manufacturing and thus having stored no data.

Also, in case that a new program is additionally stored in the nonvolatile memory, the control section can carry out the additional program without concerning the boot ROM.

Further, the starting address of the interrupt routine can be positioned on the nonvolatile memory. Thus, even if programs including the OS, etc. are written over or new programs are added frequently on the nonvolatile memory, the interrupt routine can be carried out while the new program is run. Hence, the program can be modified more flexibly.

The microcomputer having a built-in nonvolatile memory may be arranged in such a manner that the microcomputer is further furnished with a RAM, and that:

the initial program includes a starting address of an interrupt routine;

the nonvolatile memory stores a transfer program to transfer a program stored in the nonvolatile memory to the RAM; and the control section carries out a program stored in the RAM, transfers the program stored in the nonvolatile memory to the RAM in accordance with the transfer program, and when carrying out the program stored in the RAM, moves the head address of the interrupt routine included in the initial program from the nonvolatile memory to the RAM.

According to the above arrangement, when the program transferred to and stored in the nonvolatile memory in accordance with the transfer program, for example, a program for writing/erasing action with respect to the nonvolatile memory which is downloaded on the nonvolatile memory from an external device, is transferred to the RAM and run, the starting address of the interrupt routine is moved from the nonvolatile memory to the RAM.

Consequently, an action with respect to the nonvolatile memory used as the data area such as writing and erasing actions, can be executed in accordance with the program transferred from the nonvolatile memory to the RAM.

Even when an interrupt occurs while the program transferred from the nonvolatile memory is run from the RAM, the program does not run away out of control and the interrupt routine can be carried out in an adequate manner.

Another microcomputer having a built-in nonvolatile memory of the present invention is characterized by being furnished with:

a RAM;

at least one erasable nonvolatile memory for, provided in a memory space of the microcomputer, storing a head address of an interrupt routine, and a transfer program for transferring a first program having been stored therein to the RAM; and a control section for carrying out a program stored in the RAM, and transfers the first program from the nonvolatile memory to the RAM in accordance with the transfer program, and when the first program stored in the RAM is run, moves a starting address of the interrupt routine onto the RAM from the nonvolatile memory.

According to the above arrangement, the first program stored in the nonvolatile memory, for example, a user program to carry out the writing and erasing with respect to the nonvolatile memory which has been downloaded on the nonvolatile memory from an external device, is transferred to the RAM in accordance with the transfer program, and when the first program is run on the RAM, the starting address of the interrupt routine is moved from the nonvolatile memory onto the RAM.

Consequently, an action with respect to the nonvolatile memory when it is used as the data area, for example, writing and erasing actions can be executed in accordance with the first program transferred from the nonvolatile memory to the RAM.

In addition, even when an interrupt occurs while the first program is run on the RAM, the program does not run away out of control, and the interrupt routine can be carried out in an adequate manner.

The microcomputer having a built-in nonvolatile memory may be arranged in such a manner that:

a program area and a data area are set on a same nonvolatile memory;

a second program to issue a command to use the data area on the same nonvolatile memory is stored in the program area; and the control section uses the data area for data storage in accordance with the second program.

According to the above arrangement, the same nonvolatile memory can be readily used as the program area and also as the data area in accordance with the second program.

More specifically, for example, data of the specified number (of pieces) is successively read out from the specified address in the nonvolatile memory stored in the RAM in accordance with information related to the specified address and specified number of data in the non-volatile memory and the specified address in the RAM. Then, the data is successively read out from the RAM and written into the data area in the nonvolatile memory at the specified address.

For a fuller understanding of the nature and advantages of the invention, reference should be made to the ensuing detailed description taken in conjunction with the accompanying drawings.

BRIEF DESCRIPTION OF THE DRAWINGS

FIG. 15(a) is a view explaining an action with respect to the nonvolatile memory in Sequence 1 of FIG. 14;

FIG. 15(b) is a view explaining an action with respect to the nonvolatile memory in Sequence 2 of FIG. 14;

FIG. 15(c) is a view explaining an action with respect to the nonvolatile memory in Sequence 3 of FIG. 14;

FIG. 15(d) is a view explaining an action with respect to the nonvolatile memory in Sequence 4 of FIG. 14;

DESCRIPTION OF THE EMBODIMENTS (Embodiment 1)

Referring to FIGS. 1 through 5, the following description will describe one embodiment of the present invention.

Figure 2:
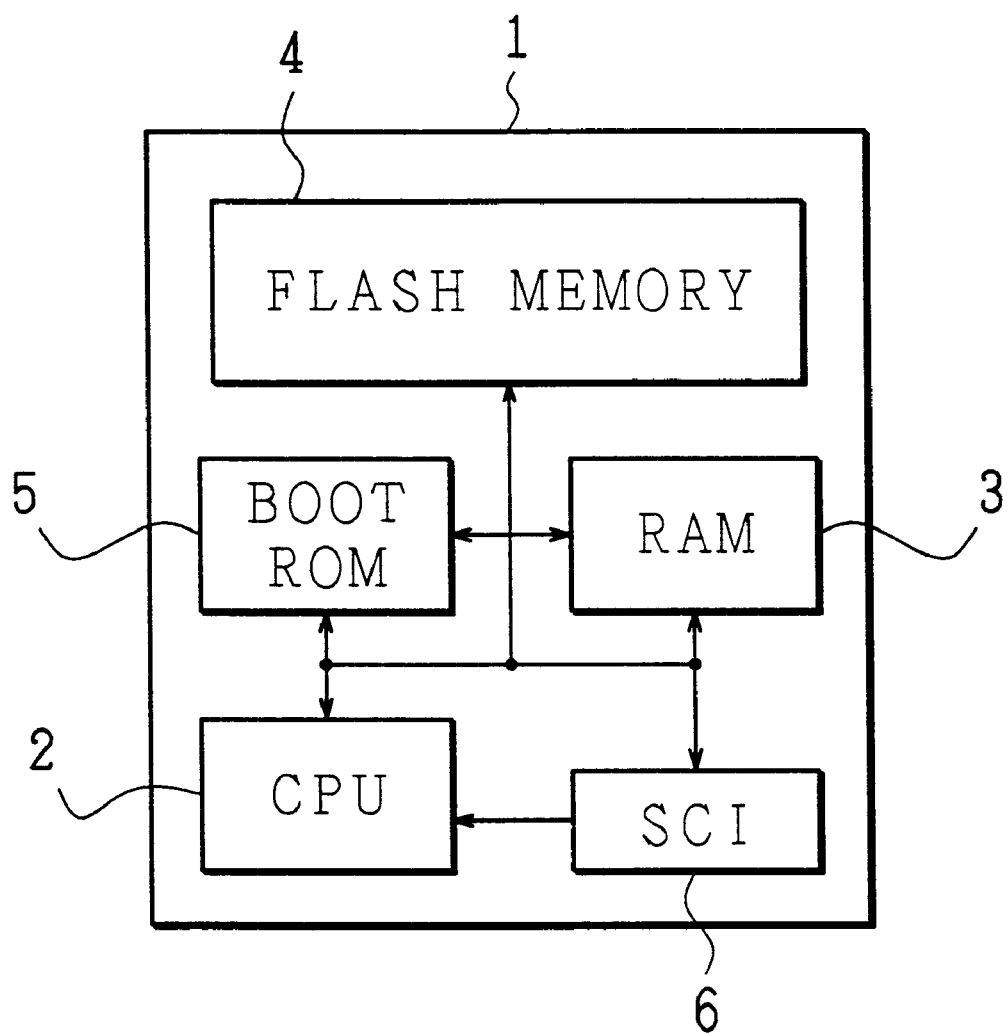
FIG. 2 is a block diagram depicting an arrangement of the 1-chip microcomputer carrying out the action of FIG. 1.

A 1-chip microcomputer representing a microcomputer having a built-in nonvolatile memory in accordance with Embodiment 1 of the present invention is arranged as shown in FIG. 2. This 1-chip microcomputer is assembled as an IC card. In the drawing, a 1-chip microcomputer 1 includes a CPU 2 (control means) for running a program, a RAM 3, a flash memory 4 as a nonvolatile memory (semiconductor nonvolatile memory), a boot ROM 5, and a serial communication interface (hereinafter, referred to as SCI) 6.

The 1-chip microcomputer 1 contains the flash memory 4 as an erasable nonvolatile memory, but it can contain any other type of erasable nonvolatile memories, such as an EEPROM and FeRAM. In case that the 1-chip microcomputer 1 is assembled as the IC card used on the provision that data therein is overwritten, it is preferable that the flash memory (nonvolatile memory) 4 can withstand overwriting of approximately 100,000 times.

Figure 3:
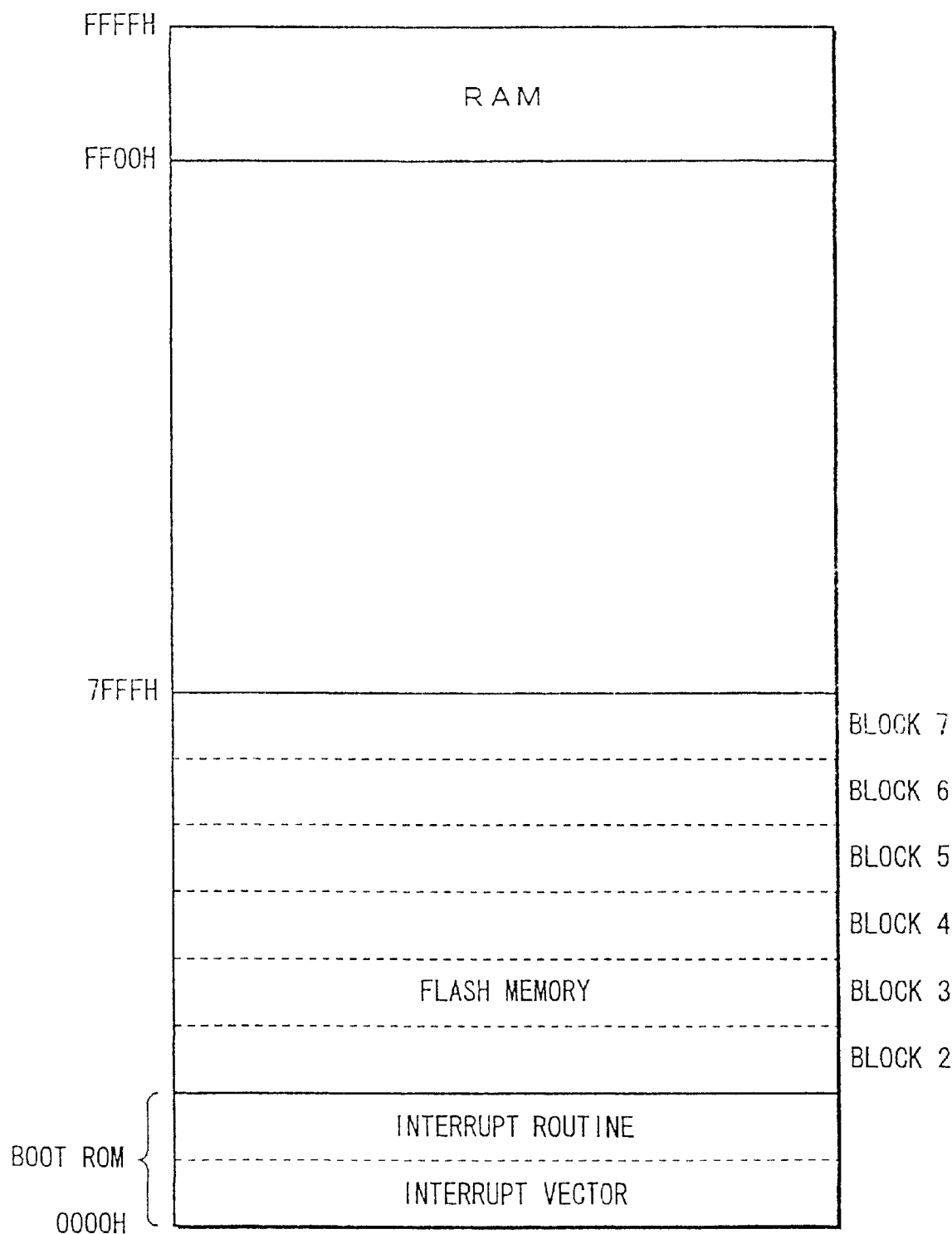
FIG. 3 is a view explaining a memory configuration of the 1-chip microcomputer of FIG. 2.

FIG. 3 shows an example memory map in the same state as immediately after the 1-chip microcomputer 1 was manufactured. That is, addresses 0000H–0FFFH are allocated to a 4-kbyte boot ROM area (boot ROM 5); addresses 0000H–7FFFH to a 32-kbyte flash memory area (flash memory 4); and addresses FF00H–FFFFH to a 256-byte RAM area (RAM3).

The address 000H is a start address, and the addresses 0000H–000FH are allocated to an interrupt vector. The flash memory 4 is divided into eight (8) blocks (BLOCKs 0–7) for every 4 kbytes, for example. Data can be erased collectively per block.

FIG. 3 shows a state where the boot ROM 5 (boot ROM area) is enabled, and as soon as the 1-chip microcomputer 1 is reset, the initial program stored in the boot ROM 5 starts to run. The boot ROM 5 also stores a transfer program, in accordance which a program is transferred to the flash memory 4 and stored therein. The head address of an interrupt routine is on the boot ROM, and the program for the interrupt routine is stored in the boot ROM.

Figure 4:
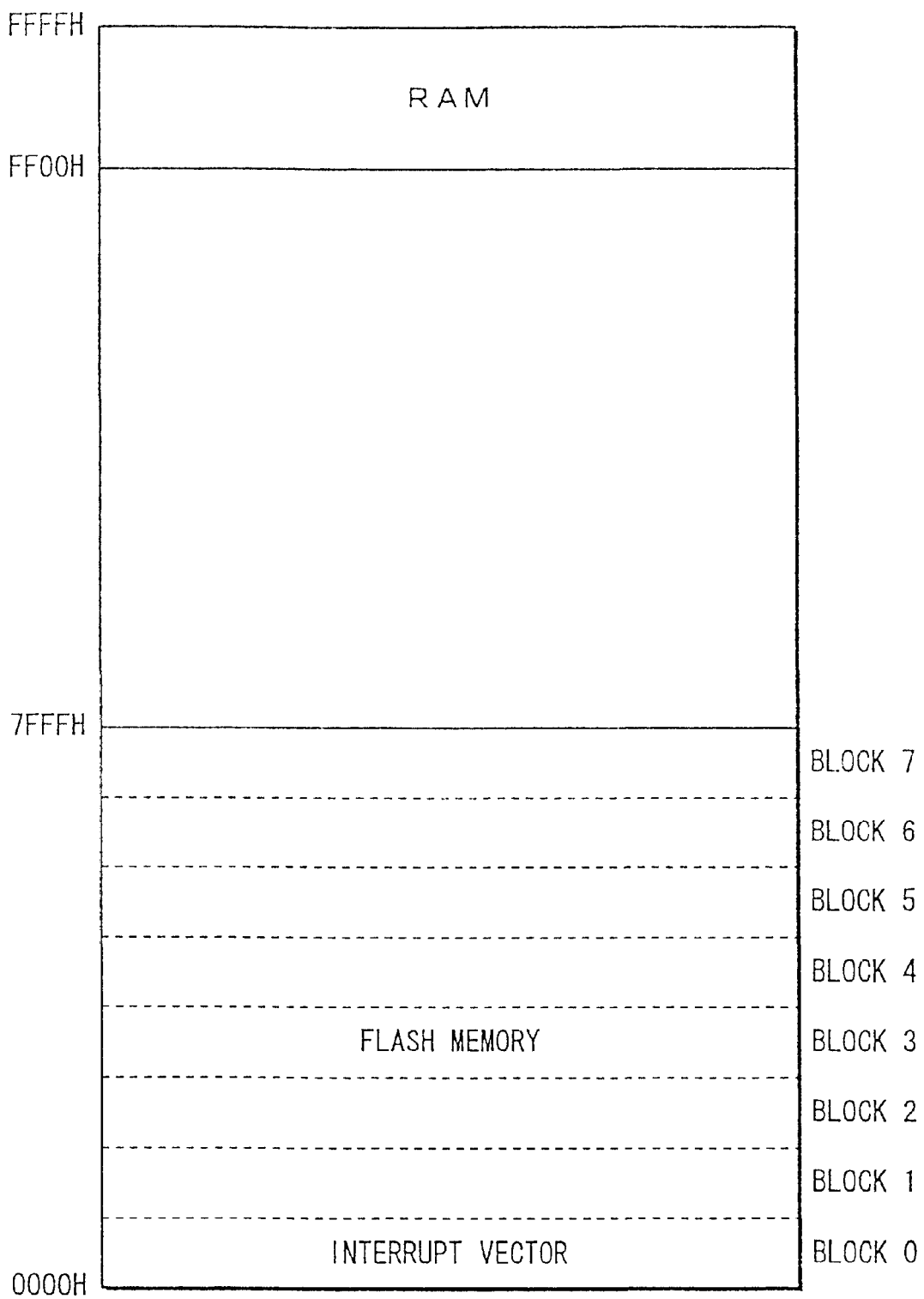
FIG. 4 is a view explaining a memory configuration when a boot ROM is removed in the memory configuration of FIG. 3.

When the transfer of the program stored in the boot ROM 5 to the flash memory 4 is completed in accordance with the transfer program, the program (control) branches to the flash memory 4 so as to remove the boot ROM 5 from a memory space. The transferring action of the program is carried out only when the flash memory 4 stores no program. FIG. 4 shows the memory map at this state. Here, the starting address of the interrupt routine is on the flash memory 4, and therefore, the address for the interrupt routine can be set arbitrarily in the program transferred to the flash memory 4.

In order to transfer a program to the flash memory 4 and write data into or erase data from the same flash memory 4 in accordance with the transferred program, in other words, in order to use the same flash memory 4 as a program area and also as a data area simultaneously, the starting address (interrupt vector) of the interrupt routine and a writing/erasing program (first program) with respect to the data area in the flash memory 4 are transferred to the RAM 3 from the flash memory 4 and stored therein.

Besides the foregoing program, programs transferred to the RAM 3 from the flash memory 4 include a preparation program for an interrupt routine program (for example, a writing/erasing suspending routine program with respect to the flash memory 4), a branching routine program for an interrupt routine program on the flash memory 4, and an aftertreatment program for an interrupt routine program carried out when the interrupt routine is completed (for example, a writing/erasing resuming routine program with respect to the flash memory 4).

Figure 5:
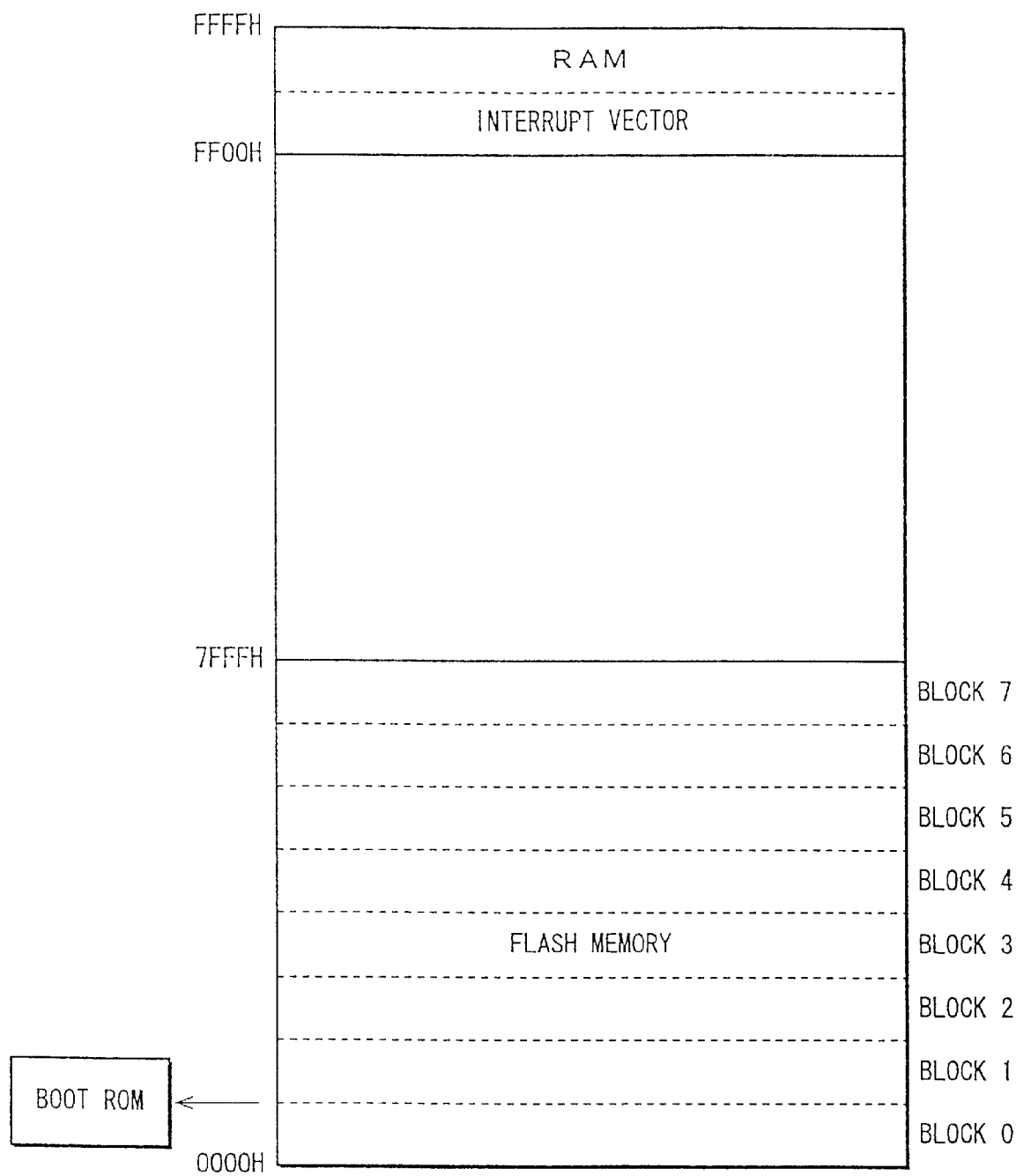
FIG. 5 is a view explaining a memory configuration when a control is switched to a RAM in the memory configuration of FIG. 4.

FIG. 5 shows the memory map after the foregoing routines are executed. In this case, the starting address of the interrupt routine is on the RAM 3. Thus, even if an interrupt occurs while data is being written into/erased from the flash memory 4, the interrupt routine can be started from the starting address of the interrupt routine stored in the RAM 3. Here again, the boot ROM 5 is removed from the memory space as shown in FIG. 5.

Figure 1:
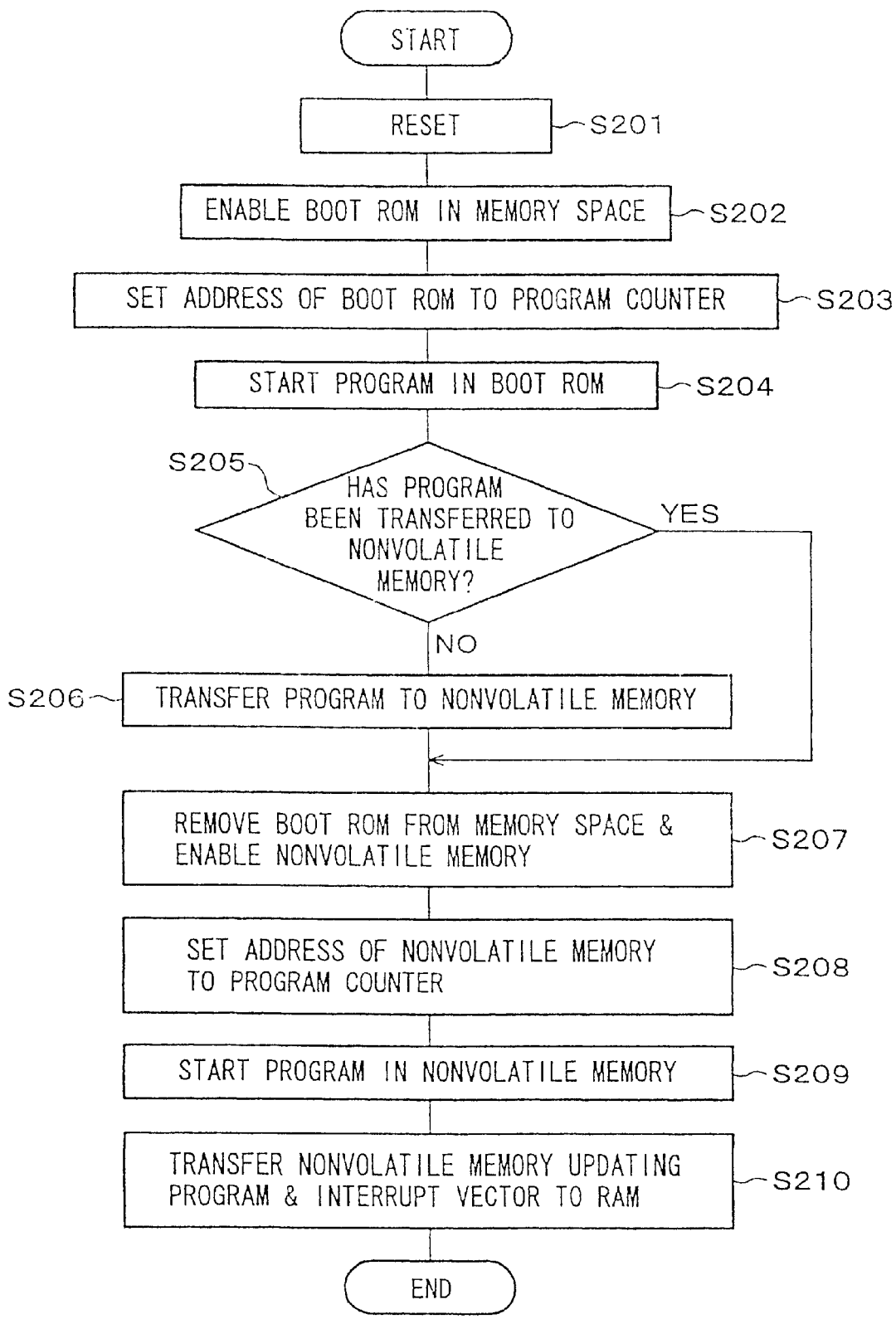
FIG. 1 is a flowchart detailing an action of a 1-chip microcomputer in accordance with one embodiment of the present invention immediately after a reset action.

Next, with reference to the flowchart of FIG. 1, the following will explain an action, by which the control is switched from the boot ROM 5 to the flash memory 4 as the nonvolatile memory immediately after the 1-chip microcomputer 1 is reset upon supply of the power.

Initially, as soon as the power supply starts, the 1-chip microcomputer 1 initiates a predetermined reset action (S201). When the reset action is completed, the CPU 2 sets the 1-chip microcomputer 1 in such a manner so as to enable the boot ROM 5 in the memory space (S202). The memory map at this point is shown in FIG. 3. Then, the CPU 2 sets the address of the boot ROM 5 to a program counter (S203).

When S203 is completed, the 1-chip microcomputer 1, namely, the CPU 2, starts to run the program stored in the boot ROM 5 (S204).

In the first place, the CPU 2 checks whether any program has already been transferred to the flash memory 4 from the boot ROM 5 (S205). If the flash memory 4 has already stored any program, the flow skips to S207. Otherwise, the program stored in the boot ROM 5 is transferred and written into the flash memory 4 in accordance with the transfer program stored in the boot ROM 5 (S206).

Next, the CPU 2 removes the boot ROM 5 from the memory space and enables the flash memory 4 (S207). The memory map 4 at this point is as shown in FIG. 4.

Next, the CPU 2 sets the address of the flash memory 4 to the program counter (S208), after which the CPU 2 starts to run the program stored in the flash memory 4 (S209).

Then, in order to update the data stored in the flash memory 4, an updating program (writing/erasing program) and the interrupt vector 3 in the flash memory 4 are transferred and stored in the RAM 3 in accordance with the transfer program stored in the flash memory 4 (S210). The memory map at this point is shown in FIG. 5.

The above example described a case where the boot ROM 5 is independently provided. However, a program which is stored in the boot ROM 5 in the above example case may be stored in the flash memory 4 in advance. In other words, the arrangement omitting the boot ROM 5 can be adopted as well, and in this case, S202 through S208 are omitted.

Figure 18:
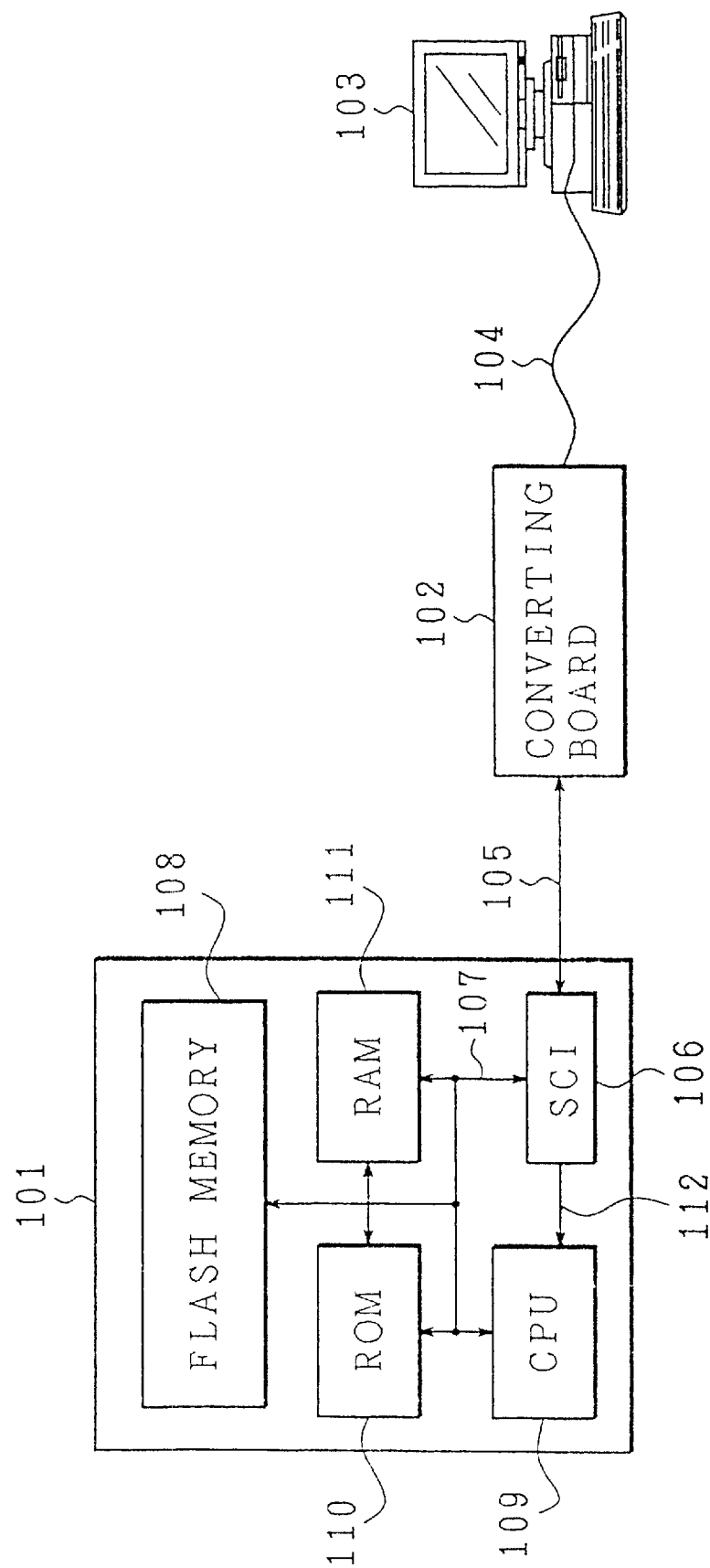
FIG. 18 is a block diagram showing a method of writing data into the conventional microcomputer having a built-in flash memory.

In order to store programs arbitrarily selected by the user (user programs), such as an application program and an upgraded OS, into flash memory 4, the 1-chip microcomputer 1 is connected to the personal computer 103 through the converting board 102 as was explained with reference to FIG. 18. In this case, the boot ROM 5 or an equivalent nonvolatile memory (flash memory 4) is enabled, and the user program supplied from the personal computer 103 is written into the nonvolatile memory (flash memory 4) by using a control program stored therein.

According to the above arrangement, the user can take an application program into the flash memory 4 as desired and run the same, in other words, the data area of the flash memory 4 can be overwritten in accordance with the application program additionally stored therein.

In addition, because the program area and also the data area can be set in the same flash memory (nonvolatile memory) 4 as has been discussed, it is not necessary to provide each in a separate chip. Thus, the 1-chip microcomputer 1, more specifically, the IC card assembled from the 1-chip microcomputer 1, can be downsized.

(Embodiment 2)

Referring to FIGS. 6 through 15, the following description will describe another embodiment of the present invention.

Figure 6:
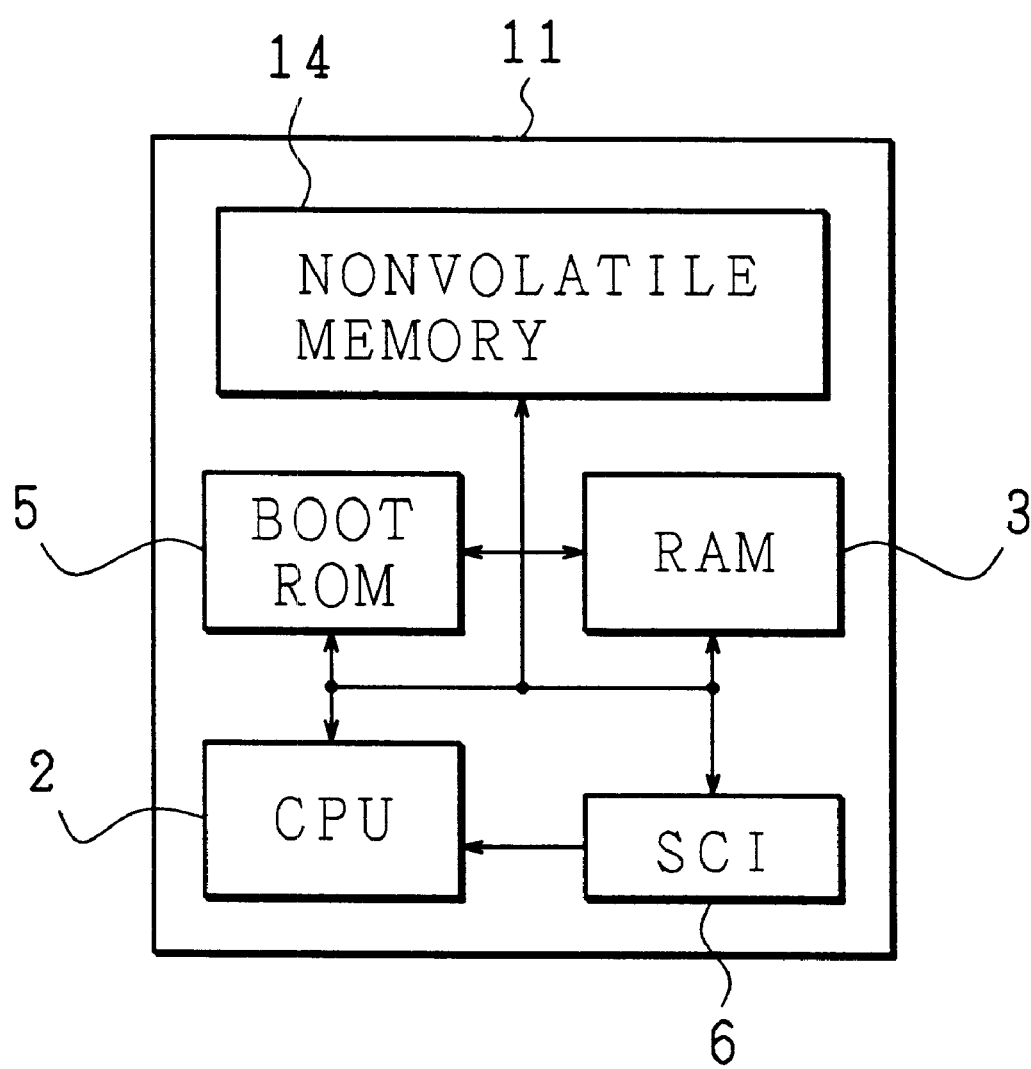
FIG. 6 is a block diagram of a 1-chip microcomputer in accordance with another embodiment of the present invention.

FIG. 6 shows an arrangement of a 1-chip microcomputer in accordance with Embodiment 2 of the present invention. In other words, a 1-chip microcomputer 11 includes a CPU 2 for running a program, a set of memories including a RAM 3, an erasable nonvolatile memory 14 (semiconductor nonvolatile memory), and a boot ROM 5, and the aforementioned SCI 6.

Figure 7:
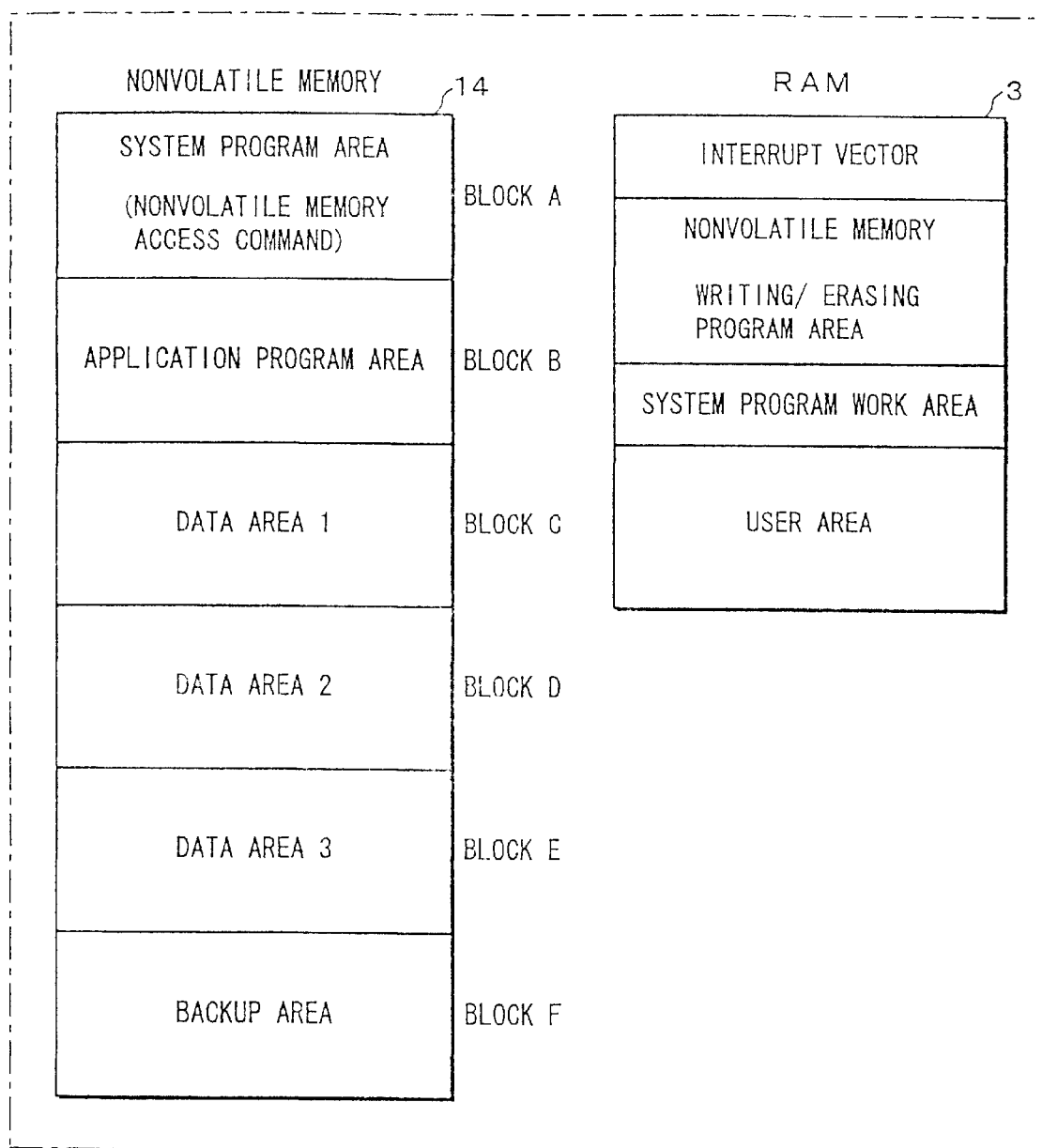
FIG. 7 is a view explaining a memory configuration of the 1-chip microcomputer of FIG. 6.

FIG. 7 shows a memory configuration of the 1-chip microcomputer 11 after the actions described with reference to FIG. 1 are completed. The RAM 3 and nonvolatile memory 14 are allocated to the address space in the CPU 2, so that a read-out access and a writing access from the CPU 2 to each memory are possible. The program stored in the boot ROM 5 will be stored in the program area of the nonvolatile memory 14 and run by the CPU 2.

A memory which can be controlled at a command issued from the CPU 2 in accordance with the program is used as the nonvolatile memory 14. Examples of the commands include a command to set the nonvolatile memory 14 to the read-out mode, a command to set the nonvolatile memory 14 to the write mode, a command to set the nonvolatile memory 14 to the erase mode, a command to suspend the writing/erasing action with respect to the nonvolatile memory 14, a command to resume the writing/erasing action with respect to the nonvolatile memory 14, a command to monitor the completion of the writing/erasing action with respect to the nonvolatile memory 14.

The nonvolatile memory 14 is composed of 4-kbyte BLOCKs A-F, and data written into the nonvolatile memory 14 is erased per block.

An operating system and a monitor system collectively referred to as a system program of the 1-chip microcomputer 11 are stored in BLOCK A.

A user application program is stored in BLOCK B. A command of the system program stored in BLOCK A can be called out from this application program.

BLOCKs C through E are used as data areas (DATA AREAs 1 through 3).

BLOCK F is used as a backup area where data which should be save when the data area is partially overwritten is temporarily stored.

The RAM 3 is composed of an interrupt vector area in the 1-chip microcomputer 11, a nonvolatile memory writing/erasing program area for storing a writing/erasing program for carrying out a data writing action and an erasing action with respect to the nonvolatile memory 14, a system program work area as a work area when the system program is run, and a user area.

The interrupt vector and the writing/erasing program with respect to the nonvolatile memory 14 are initially stored in the system program area of the nonvolatile memory 14, and as was explained with reference to FIG. 1, the foregoing programs are transferred to the RAM 3 in advance in accordance with the system program.

Figure 8:
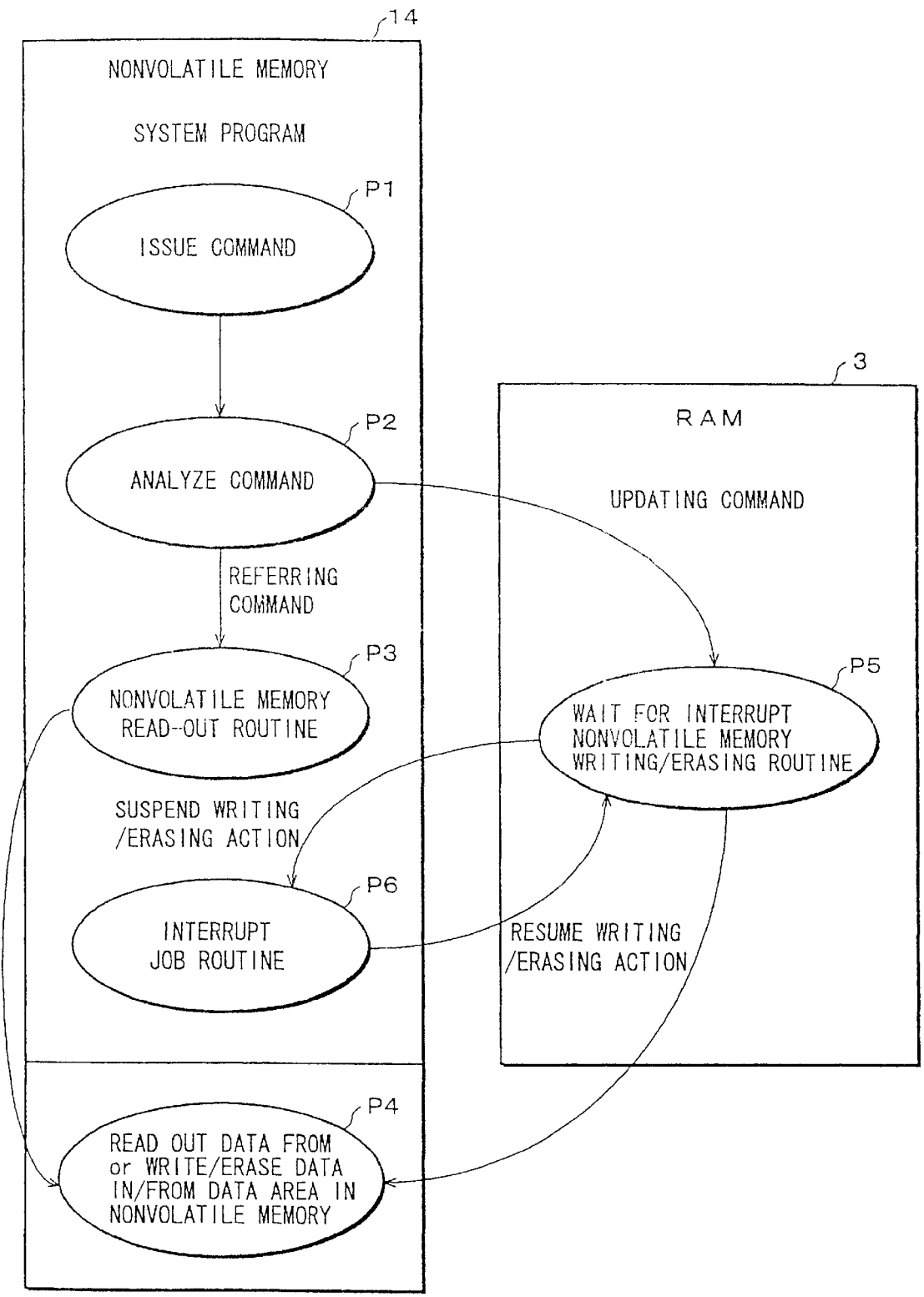
FIG. 8 is a block diagram depicting an arrangement to carry out read-out and writing actions with respect to a nonvolatile memory in the memory in the memory configuration of FIG. 7.

FIG. 8 shows the read-out access and writing access with respect to the nonvolatile memory 14. Accesses to the nonvolatile memory 14 are controlled by the CPU 2 at a command from the system program.

The above program (each access) is started upon issuance of a command from the system program (P1). The command is analyzed by a command interface (P2). Here, a command to read out data from the nonvolatile memory 14 is defined as a referring command, and a command (second program) to write data into or erase data from the nonvolatile memory 14 is defined as an updating command. These commands are stored in the nonvolatile memory 14 and carried out on the same.

In case that the referring command is issued, the control is switched to a read-out routing with respect to the nonvolatile memory 14 (P3), and data in the data area of the nonvolatile memory 14 is read out (P4).

On the other hand, in case that the updating command is issued, parameters necessary for the data writing/erasing actions are set on the nonvolatile memory 14, and then the control is switched to the writing/erasing routing (P5) with respect to the nonvolatile memory 14 which has been stored in the RAM 3 in advance.

In other words, the 1-chip microcomputer 11 of the present invention includes only one nonvolatile memory 14. For this reason, if the updating command is issued, data can not be written into or erased from the nonvolatile memory 14 while the program stored in the same nonvolatile memory 14 is being run. Thus, in this case, the control is switched to the writing/erasing routine (P5) with respect to the nonvolatile memory 14 which has been transferred to and stored in the RAM 3 in advance, whereby the writing/erasing action (P4) with respect to the data area of the nonvolatile memory 14 is carried out.

In comparison with the data read-out from the nonvolatile memory 14, this writing/erasing action takes time, and in particular, the writing action takes a few hundred times as long, and the erasing per block takes a few seconds. For example, the 1-byte data read-out takes tens of nanoseconds, while the 1-byte data writing takes tens of microseconds and the 64-kbyte data erasing per block takes hundreds of milliseconds. Assume that it takes 600 milliseconds for erasing data in one block, it takes approximately 1.8 sec. to erase the data in three blocks.

As has been discussed, the writing/erasing action takes a lengthy time, and for this reason, the occurrence of an interrupt is monitored while the writing/erasing routine with respect to the nonvolatile memory 14 is run on the RAM 3.

Upon occurrence of an interrupt, the writing/erasing routine is suspended, and the interrupt routine on the nonvolatile memory 14 is started (P6). When the interrupt routine is completed, the control returns to the writing/erasing routine with respect to the nonvolatile memory 14 on the RAM 3, and the writing/erasing action is resumed.

Figure 9:
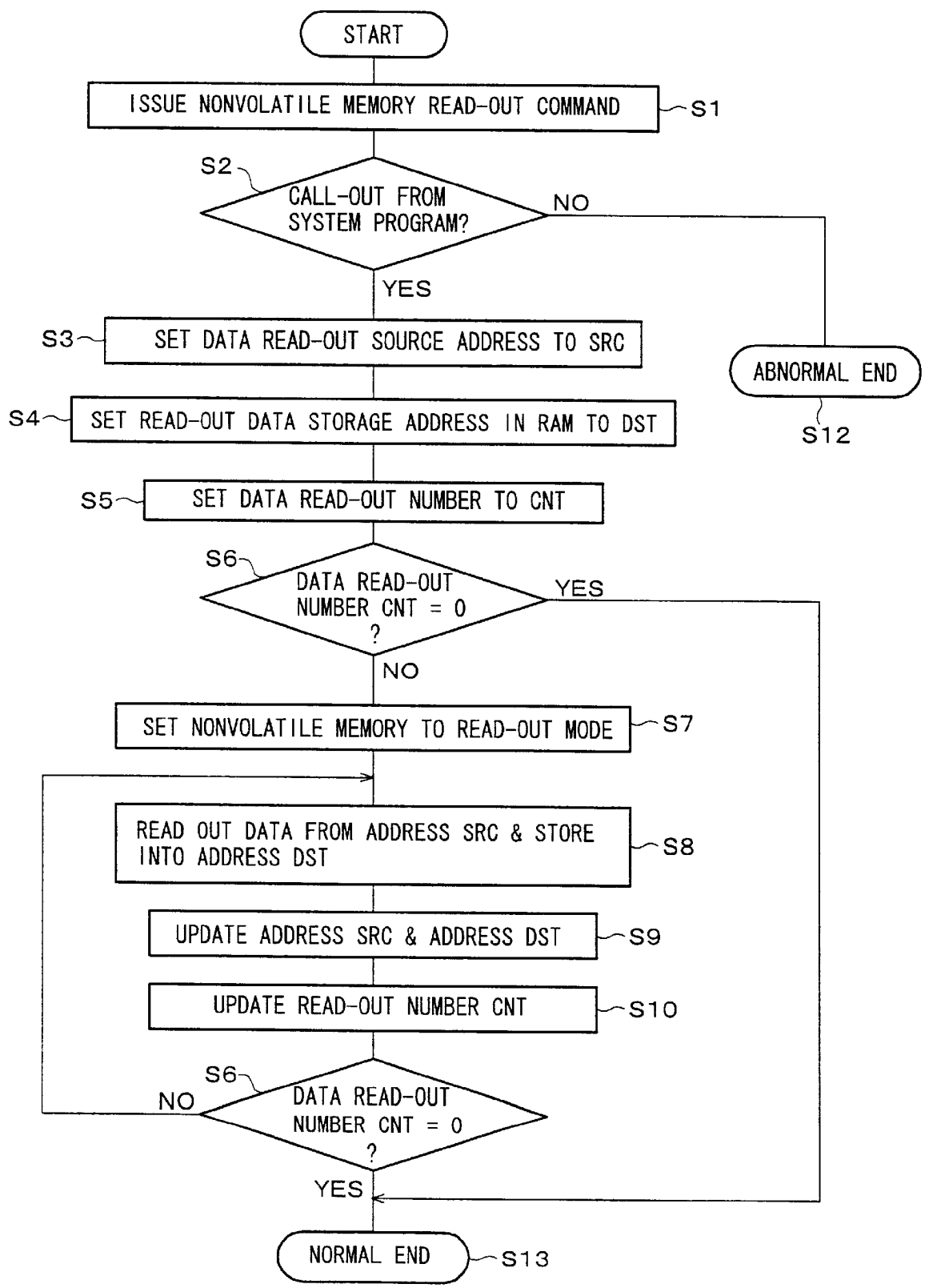
FIG. 9 is a flowchart detailing successive data read-out action from the nonvolatile memory of FIG. 7.

Next, the following will explain the read-out action to read out data successively from the nonvolatile memory 14 of the 1-chip microcomputer 11 with reference to the flowchart of FIG. 9.

Initially, when a successive read-out command for reading out data successively from the nonvolatile memory 14 is issued (Si), the CPU 2 checks whether this command is called out from the system program or not (S2).

If the command is judged as not being called out from the system program, the flow branches to S12 and execution is terminated. Otherwise, the address of the nonvolatile memory 14 as the read-out source is set to a variable SRC (S3).

Next, a storage address in the RAM for the read-out data from the nonvolatile memory 14 is set to a variable DST (S4), and the data read-out number from the nonvolatile memory 14 (the number of times data should be read out) is set to a variable CNT (S5).

Next, whether the data read-out number is 0 (zero) or not is checked (S6), and if it is 0 (zero), the flow branches to S13 and execution is terminated. Otherwise, the CPU 2 issues a command to the nonvolatile memory 14 to set the same to the read-out mode, whereupon the nonvolatile memory 14 is set to the read-out mode (S7).

Next, data is read out from the address SRC in the nonvolatile memory 14, and stored in the RAM 3 at the address DST (S8). Then, the addresses SRC and DST are updated to addresses for the following data read-out (S9), and the read-out number CNT is decremented by one (S10).

Next, whether the data read out number from the nonvolatile memory 14, that is, the variable CNT, is 0 (zero) or not is checked to judge whether the last data is read out or not (S11). If the last data is not read out yet, S8 through S11 are repeated until the last data is read out, and the job is completed when the last data is read out (S13).

Figure 10:
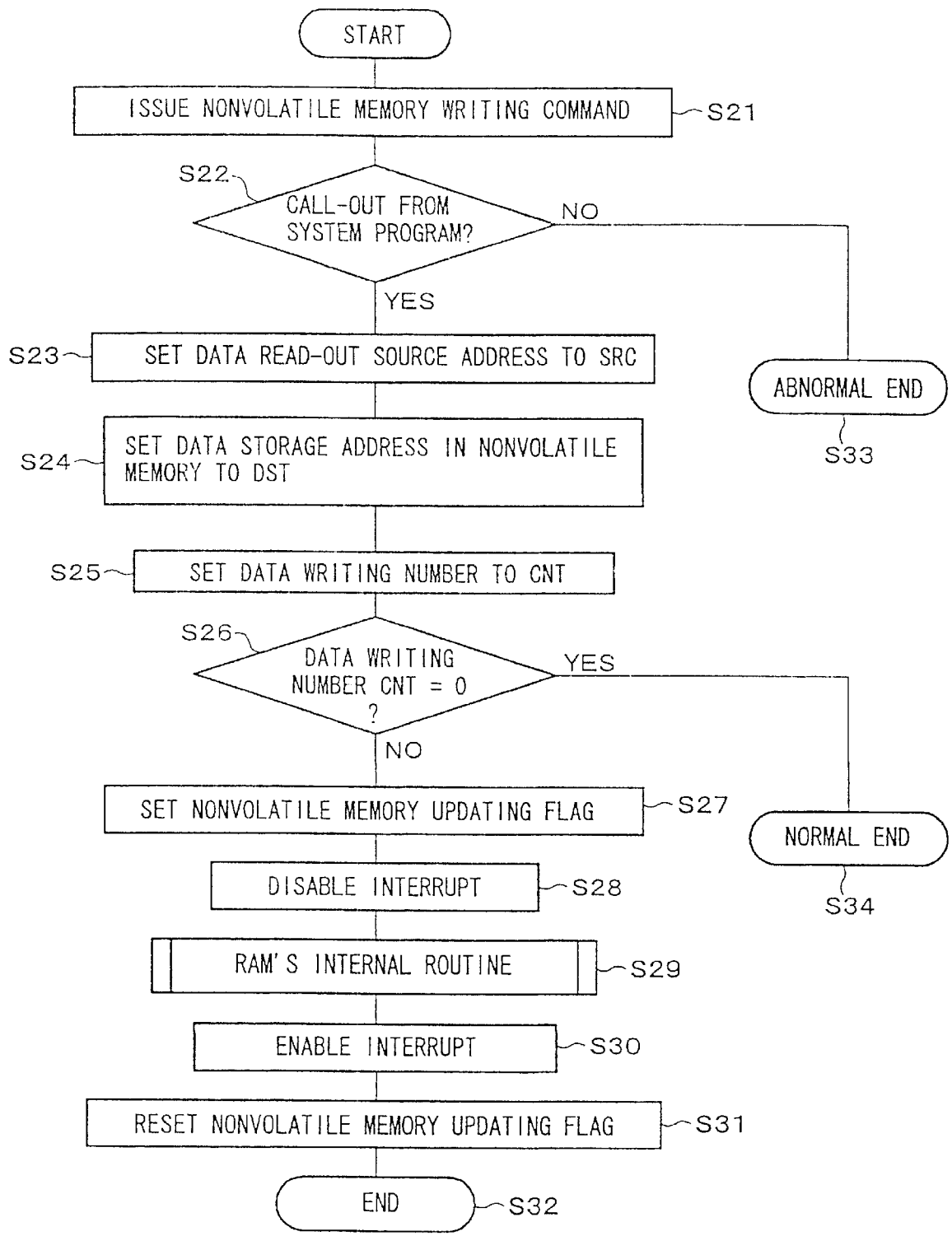
FIG. 10 is a flowchart detailing an action to read out data from a specified area in the nonvolatile memory or RAM of FIG. 6 and write the same into a specified area in the nonvolatile memory.

Next, with reference to the flowchart of FIG. 10, the following will describe the action in the 1-chip microcomputer 11 to successively read out data from a specified area in the nonvolatile memory 14 or RAM 3 and write the same into a specified area in the nonvolatile memory 14.

Initially, when a command of successive data writing into the nonvolatile memory 14 is issued (S21), the CPU 2 checks whether this command is called out from the system program or not (S22).

If the command is judged as not being called out from the system program, the flow branches to S33 and execution is terminated. Otherwise, the address of the nonvolatile memory 14 or RAM 3 as the data read-out source is set to a variable SRC (S23).

Next, a storing address used when writing data into the nonvolatile memory 14 is set to a variable DST (S24), and the data writing number into the nonvolatile memory 14 (the number of times data should be written) is set to a variable CNT (S25).

Next, whether the data writing number CNT is 0 (zero) or not is checked (S26). If CNT is 0 (zero), the flow branches to S34 and execution is terminated. Otherwise, a flag indicating that the nonvolatile memory 14 is updating is set to 1 (S27), and any interrupt is disabled (S28).

The interrupt is disabled, so that, when the control is switched to the routine on the RAM 3 by the action in the following S29, the interrupt routine on the nonvolatile memory 14 is not started uselessly by the occurrence of the interrupt. The routines thus far are carried out by the program on the nonvolatile memory 14 (program stored in the nonvolatile memory 14).

Here, data can not be written into the nonvolatile memory 14 while the program stored therein is being run thereon. Thus, the control is switched to the program which has been transferred in advance to the RAM 13 from the nonvolatile memory 14 in accordance with the system program, that is, the RAM's internal routine (S29).

When the RAM's internal routine is completed, the interrupt which has been disabled is enabled again, and the control is switched to the program on the nonvolatile memory 14 again (S30).

Subsequently, the updating flag of the nonvolatile memory 14 is reset to 0 (zero) (S31), and the writing action with respect to the nonvolatile memory 14 is completed (S32).

Figure 11:
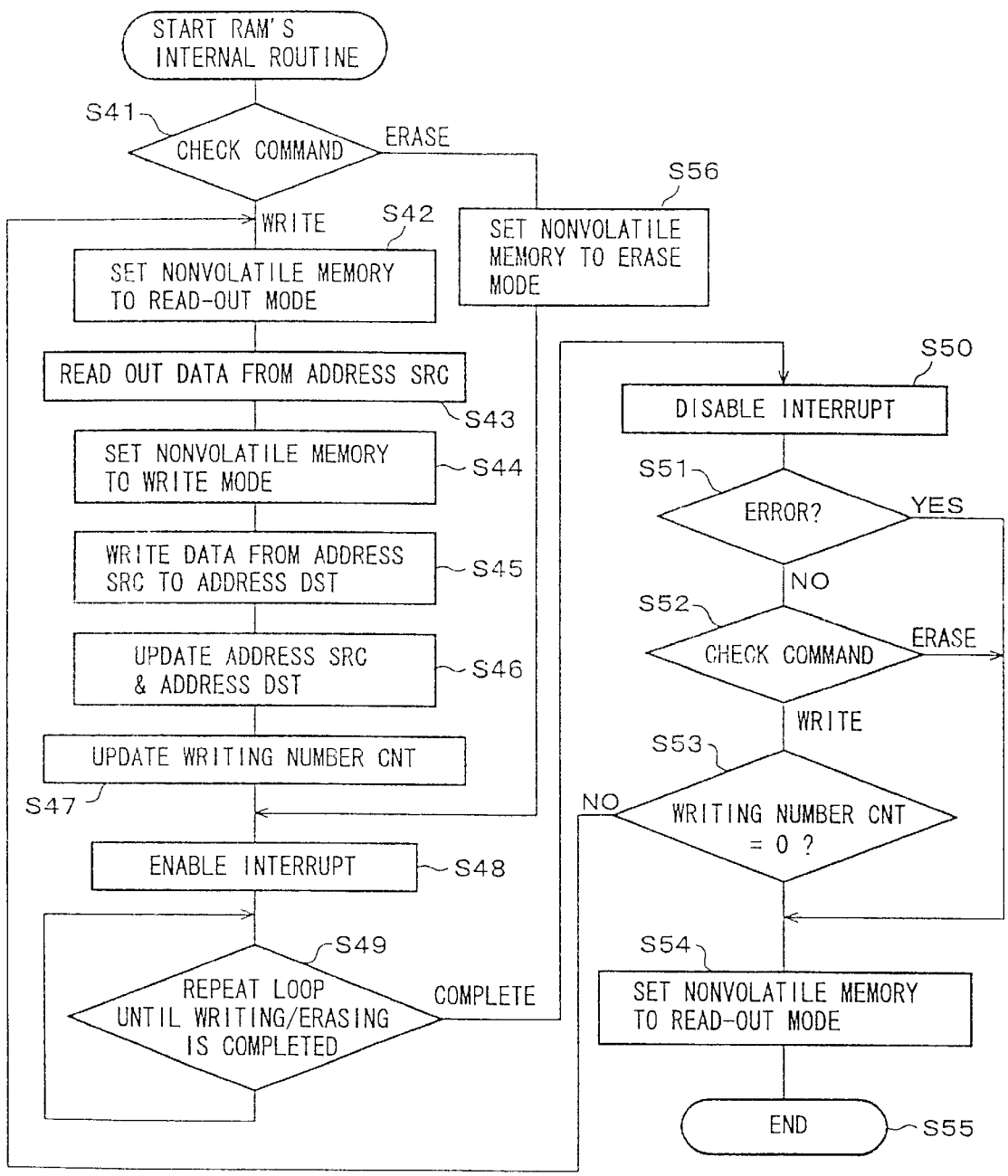
FIG. 11 is a flowchart detailing actions in a RAM's internal routine of FIG. 10.

Next, the following will explain the actions involved in the RAM's internal routine in S29 of FIG. 10 with reference to the flowchart in FIG. 11.

When the control is switched to the program on the RAM 3 from the program on the nonvolatile memory 14, the CPU 2 checks whether the command called out from the program is a writing command or an erasing command in the first place (S41). The writing command is a command to write data into the data area in the nonvolatile memory 14, and the erasing command is a command to erase data written into the data area in the nonvolatile memory 14.

If the command is judged as being the writing command, the CPU 2 issues a command to the nonvolatile memory 14 to set the same into the read-out mode, whereupon the nonvolatile memory 14 is set to the readout mode (S42). Then, the CPU 2 reads out data from the address specified by the variable SRC (S43).

Next, the CPU 2 issues a command to the nonvolatile memory 14 to set the same to the write mode, whereupon the nonvolatile memory 14 is set to the write mode (S44). Then, the CPU 2 writes data which is read out in S43 in the nonvolatile memory 14 at the address specified by the variable DST (S45), whereupon the writing into the nonvolatile memory 14 starts.

Then, the SRC address and DST address are updated for the following data writing (S46), and the writing number CNT is decremented by one (S47).

Because the data writing into the nonvolatile memory 14 takes a lengthy amount of time, the CPU 2 enables and interrupt (S48), and issues a command to the nonvolatile memory 14 to monitor the completion of the writing action, and waits for this action to be completed (S49). If an interrupt with a high priority occurs before the writing action is completed, the control is switched to an interrupt routine of FIG. 12 which will be described below.

Then, upon detection of the completion of the writing action with respect to the nonvolatile memory 14, the CPU 2 disables any interrupt (S50).

Subsequently, the CPU 2 checks whether any error has occurred or not by this writing action with respect to the nonvolatile memory 14 (S51). If the occurrence of an error is judged, the flow skips to S54, and the CPU 2 issues a command to the nonvolatile memory 14 to set the same to the read-out mode, whereupon the nonvolatile memory 14 is set to the readout mode, and the RAM's internal routine is terminated (S55).

In the judgment in S51, in case that the writing action with respect to the nonvolatile memory 14 is completed normally without causing any error, if the command issued to the nonvolatile memory 14 is the writing command (S52), the flow proceeds to S53, and if the command is the erasing command, the flow skips to S54.

In S53, whether the variable CNT indicating the remaining data writing number into the nonvolatile memory 14 is 0 (zero) or not is judged, so as to check whether the last data is written into the nonvolatile memory 14. If it is judged that the last data is not written yet, S42 through S52 are repeated. Otherwise, the flow proceeds to S54, and the nonvolatile memory 14 is set to the read-out mode, and the actions involved in the RAM's internal routine are completed (S55).

Figure 12:
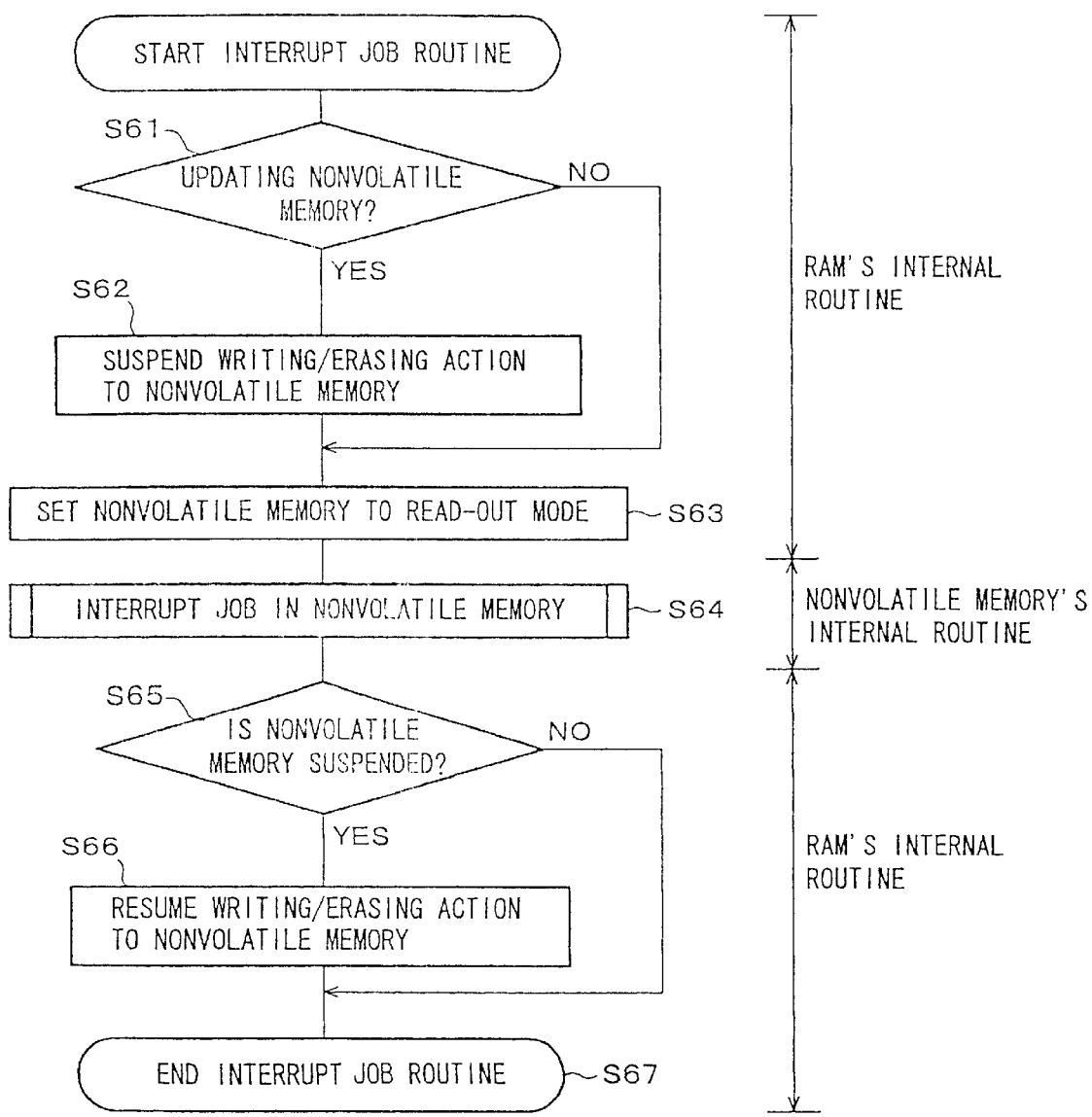
FIG. 12 is a flowchart detailing an interrupt routine occurred during the writing/erasing action with respect to the nonvolatile memory of FIG. 11.

Next, with reference to the flowchart of FIG. 12, the following will describe an action when an interrupt occurs while the completion of the writing action with respect to the nonvolatile memory 14 has been monitored as the action in S49 for the RAM's internal routine of FIG. 11.

In the loop of S49, when an interrupt occurs, the CPU 2 reads out the address of the corresponding interrupt routine from the interrupt vector in the RAM 3 of FIG. 7. Accordingly, the control is switched to the interrupt routine stored in the nonvolatile memory 14.

In addition to the aforementioned starting address (interrupt vector) of the interrupt routine and the writing/erasing program with respect to the data area in the nonvolatile memory 14, the following are transferred to the RAM 3 from the nonvolatile memory 14 in advance: a preparation program for the interrupt routine program (for example, the suspending routine program for the writing/erasing action with respect to the nonvolatile memory 14), a branching routine program for the interrupt routine program on the nonvolatile memory 14, and an aftertreatment program for the interrupt routine program which is carried out after the interrupt routine is completed (for example, a resuming routine program for the writing/erasing action with respect to the nonvolatile memory 14).

In the interrupt routine, when an interrupt occurs, whether data in the nonvolatile memory 14 is being updated or not, that is, whether the writing/erasing action is taken with respect to the nonvolatile memory 14, is checked in the first place (S61). If data in the nonvolatile memory 14 is being updated, the CPU 2 issues a command to the nonvolatile memory 14 to suspend the updating action, whereupon the updating action is suspended. In other words, the CPU 2 branches the control to the preparation routine for the interrupt routine on the RAM 3 (the starting address of the preparation for the interrupt routine) from the content of the interrupt vector, and suspends the writing/erasing action with respect to the nonvolatile memory 14. On the other hand, if data in the nonvolatile memory 14 is not being updated, the flow skips S62 and proceeds to S63.

In S63, the CPU 2 issues a command to the nonvolatile memory 14 to set the same to the read-out mode, whereupon the nonvolatile memory 14 is set in the read-out mode.

Because the CPU 2 is now allowed to carry out the interrupt routine stored in the nonvolatile memory 14, the CPU 2 switches the control to the program on the nonvolatile memory 14, in other words, branches the control to the address for the interrupt routine on the nonvolatile memory 14, and carries out the interrupt routine (S64).

Then when the above interrupt routine on the nonvolatile memory 14 is competed, the CPU 2 returns to the program stored in the RAM 3, and checks whether the updating action of the nonvolatile memory 14 is suspended or not (S65).

If the updating action of the nonvolatile memory 14 is not suspended, the flow skips to S67, and the interrupt routine is terminated. Otherwise, the CPU 2 issues a command to the nonvolatile memory 14 to resume the writing/erasing action with respect to the same, whereupon the updating action of the nonvolatile memory 14 is resumed (S66). In other words, the CPU 2 branches the control to the aftertreatment routine for the interrupt routine (the starting address of the aftertreatment for the interrupt routine) on the RAM 3, and resumes the updating routine. Then, when the updating routine is completed, the CPU 2 terminates the interrupt routine (S67). Subsequently, the flow returns to the loop of S49 of FIG. 11.

According to the above actions, the interrupt routine can be carried out in a reliable manner for an interrupt which occurred while the data in the nonvolatile memory 14 is updated.

Figure 13:
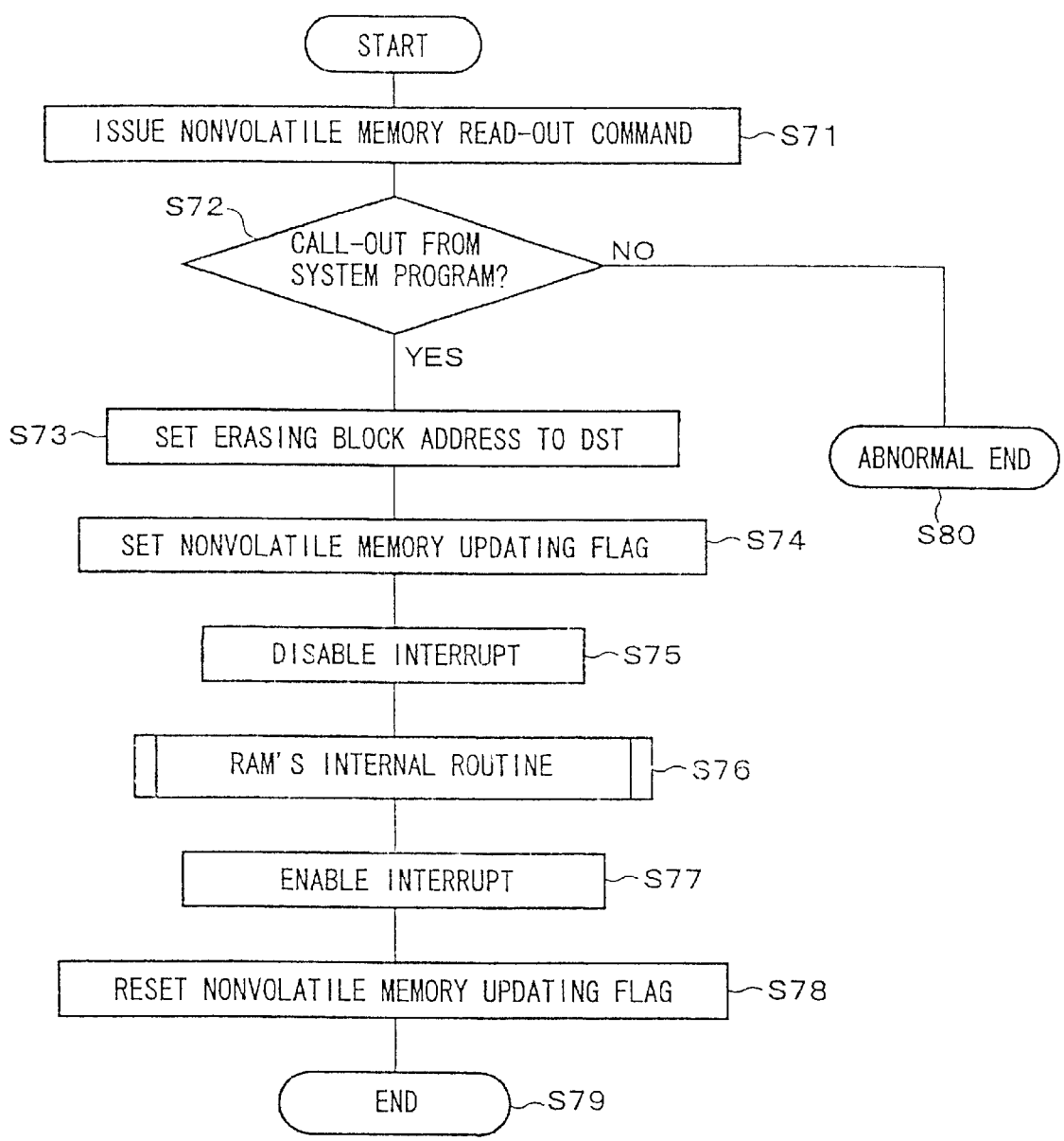
FIG. 13 is a flowchart detailing a data erasing action with respect to the nonvolatile memory of FIG. 6.

Next, the following will explain and erasing action of a specified block in the nonvolatile memory 14 with reference to the flowchart of FIG. 13.

Initially, when an erasing command is issued to the nonvolatile memory 14 (S71), the CPU 2 checks whether this command is called out from the system program or not (S72).

If the command is judged as not being called out from the system program, the flow branches to S80 and the routine is terminated. Otherwise, the address of the block to be erased in the nonvolatile memory 14 is set to a variable DST (S73). Then, the CPU 2 sets a flag indicating the updating action of the nonvolatile memory 14 to 1 (S74), and disables any interrupt (S75).

The interrupt is disabled, so that, when the control is switched to the routine on the RAM 3 by the action in the following S76, the interrupt routine on the nonvolatile memory 14 is not started uselessly by the occurrence of an interrupt. The routines thus far are carried out by the program on the nonvolatile memory 14.

It is impossible to erase the data in an arbitrary block in the nonvolatile memory 14 while the program on the nonvolatile memory 14 is being run. Thus, the control is switched to a program which has been transferred to the RAM 3 in advance in accordance with the system program and stored therein, that is, the RAM's internal routine (S76).

When the routines within the RAM are completed, the CPU 2 enables an interrupt which has been disabled, and switches the control on the program on the nonvolatile memory 14 again, that is, the block erasing action with respect to the nonvolatile memory 14 (S77).

Then, the updating flag of the nonvolatile memory 14 is reset to 0 (S78), and the block erasing action with respect to the nonvolatile memory 14 is terminated (S79).

The actions involved in the RAM's internal routine in S76 are the same as those described in the flowchart of FIG. 11.

In S41 of the flowchart of FIG. 11, because the command is the erasing command, the flow proceeds to S56 and the CPU 2 issues a command to the nonvolatile memory 14 to erase data stored therein, whereupon the erasing action for one block having the specified address in the nonvolatile memory 14 set in the variable DST is started.

Then, because the erasing action for 1 block in the nonvolatile memory 14 takes a lengthy time, the CPU 2 enables an interrupt (S48), and waits for the completion of the erasing action while monitoring the occurrence of an interrupt (S49). The actions when an interrupt occurs are the same as those described with reference to the flowchart of FIG. 12.

Then, when the CPU 2 detects the completion of the erasing action of one block in the nonvolatile memory 14, the CPU 2 disables an interrupt (S50).

Then, the CPU 2 checks whether any error has occurred during the 1-block erasing action with respect to the nonvolatile memory 14 (S51). When the occurrence of an error is judged, the flow skips to S54, and the CPU issues a command to the nonvolatile memory 14 to set the same to the read-out mode, whereupon the nonvolatile memory 14 is set to the read-out mode and the routines involved in the RAM's internal routine are terminated (S55).

In the judgment in S51, in case that the 1-block erasing action with respect to the nonvolatile memory 14 is completed normally without causing any error, if the command issued to the nonvolatile memory 14 is the erasing command (S52), the flow skips to S54, and after the foregoing actions are completed, the routines involved in the RAM's internal routine are terminated (S55).

Figure 14:
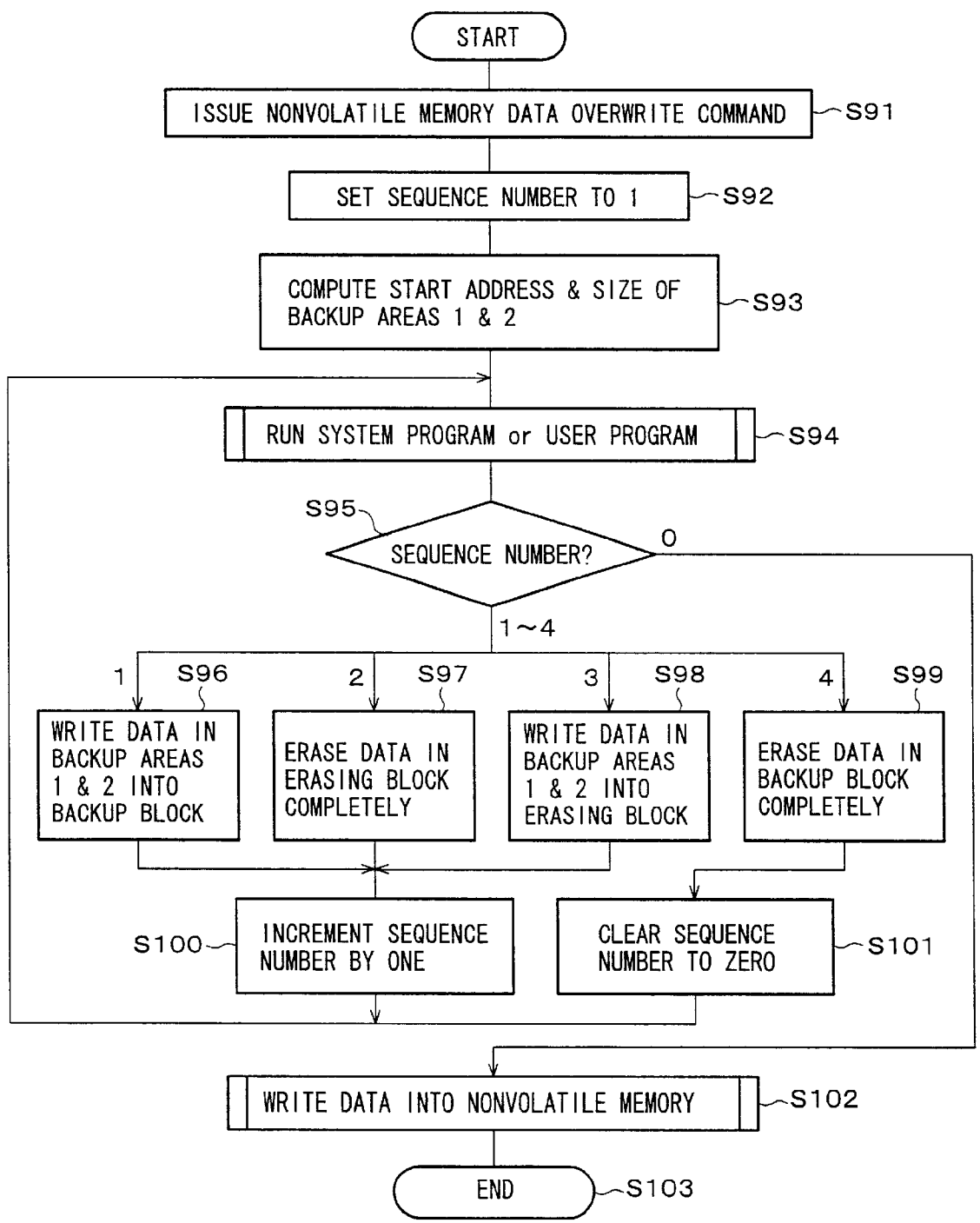
FIG. 14 is a flowchart detailing a data overwriting action with respect to the nonvolatile memory of FIG. 6.
Figure 16:
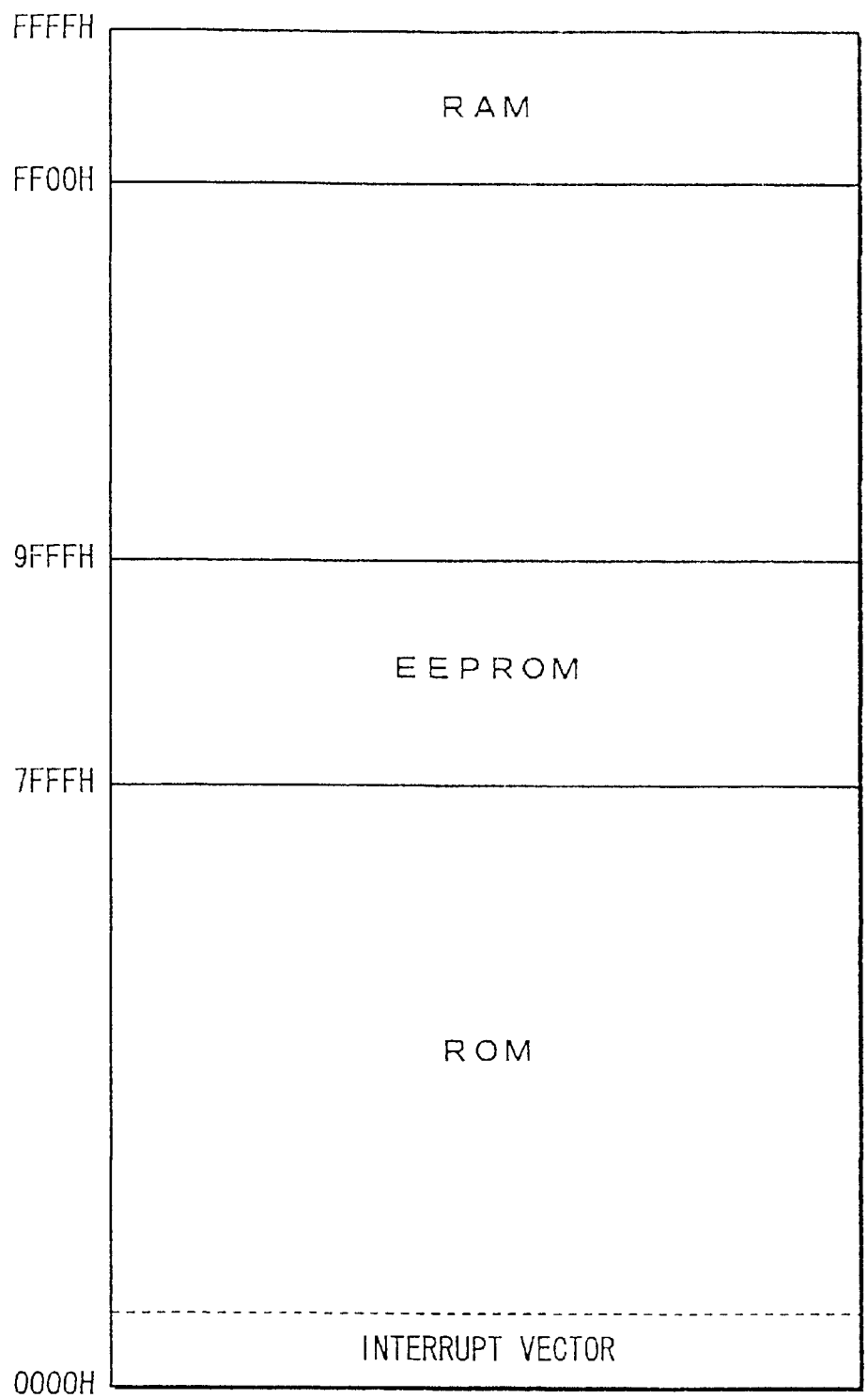
FIG. 16 is a view explaining a memory configuration of a conventional microcomputer having a built-in EEPROM used as an IC card.
Figure 17:
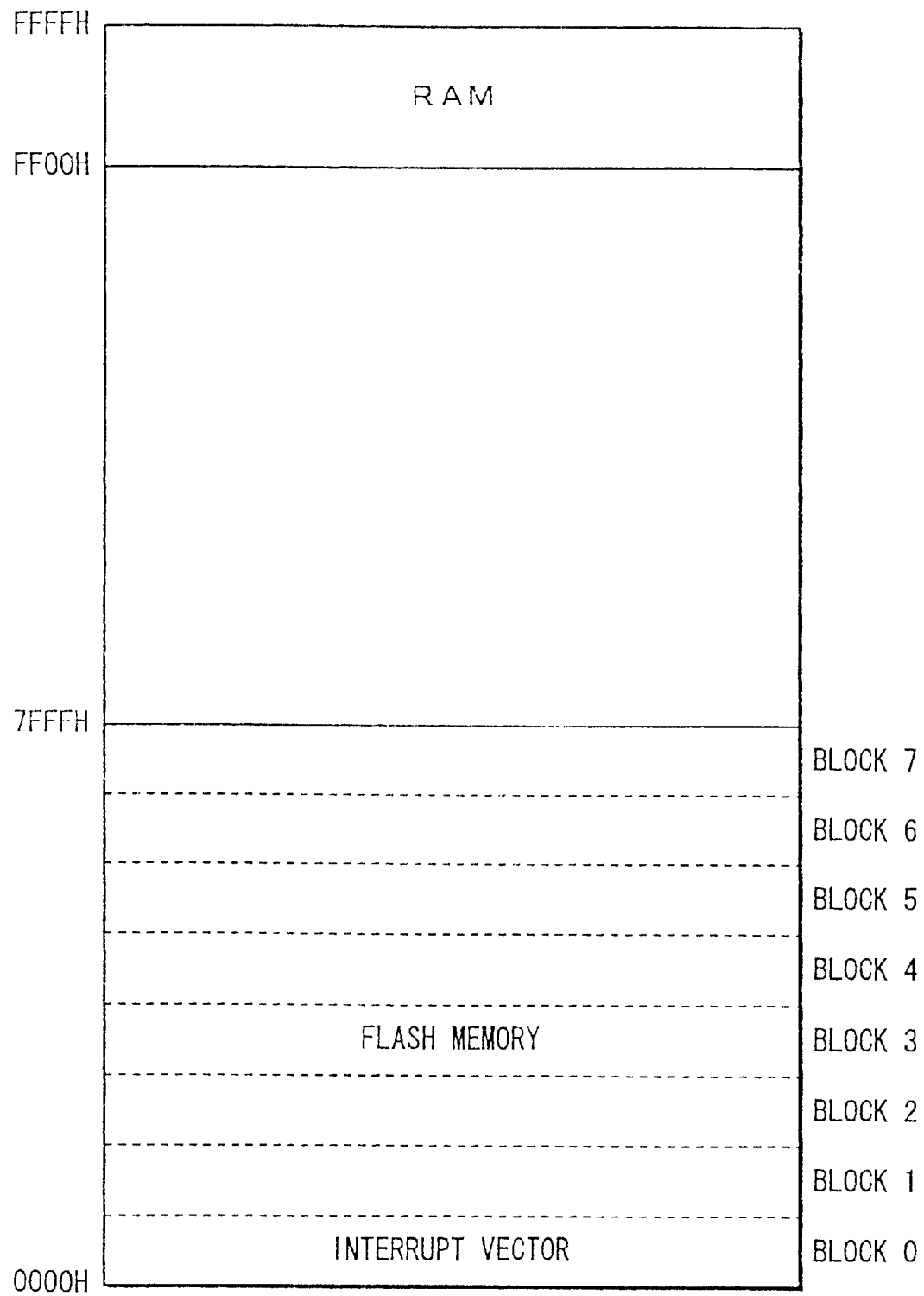
FIG. 17 is a view explaining a memory configuration of a conventional microcomputer having a built-in flash memory.

Next, the following will explain in detail a data overwriting action (updating action) with respect to the nonvolatile memory 14 with reference to the flowcharts of FIG. 14 and FIG. 15.

In order to overwrite data in the nonvolatile memory 14, data in an overwrite area in the nonvolatile memory 14 should be erased. Data is erased per block in the nonvolatile memory 14 of the 1-chip microcomputer of the present embodiment. Thus, in order to erase data in an arbitrary area within the block, a predetermined procedure has to be taken.

FIG. 15 shows such a procedure to erase data in an arbitrary area within the block of the nonvolatile memory 14. The overwriting action on the nonvolatile memory 14 is performed by erasing data in an overwrite area first, and thence successively writing data into this particular area. Jobs in S93 through S101 of FIG. 14 correspond to a procedure form Sequence 1 of FIG. 15(*a*) to Sequence 4 of FIG. 15(*d*). The procedure is divided into sequences because each sequence takes time, routines in the system program can be carried out per sequence. For example, BLOCKs C through E of FIG. 15(*a*) correspond to BLOCKs C through E as DATA AREAs 1 through 3 of FIG. 7.

In FIG. 14, when a data overwrite command is issued to the nonvolatile memory 14 in accordance with the system program (S9 1), the CPU 2 erases data in the overwrite area in the first place.

More precisely, the CPU 2 sets the sequence number to 1 (S92), and computes the start address and size of each of backup areas 1 and 2 (BLOCKs C and E), which are areas corresponding to erasing blocks (BLOCKs C through E) excluding an erasing area (BLOCK D) (S93).

Then, the CPU 2 carries out the system program or user program depending on the case (S94).

The CPU 2 checks whether all the erasing action sequences to erase data in the arbitrary area have been completed or not (S95). If the sequence number exhibits a number other than 0 (zero), not all the sequences have been completed, and the flow proceeds to any of S96 through S99 depending on the sequence number.

When the sequence number exhibits 1, in S96, as shown in FIG. 15(a), the successive writing action to the nonvolatile memory 14 is carried out in accordance with the start addresses and sizes of the backup areas computed in S92, whereby data is written into a backup block. For example, a backup area (BLOCK F) in the nonvolatile memory 14 of FIG. 7 is used as the backup block. It should be appreciated that data in the backup area is erased in advance.

When the backup action is completed, the sequence number is incremented by one in S100 to move onto the following sequence, and a series of actions are repeated from S94.

When the sequence number exhibits 2, data within the erasing block including the erasing area is erased in S97 as shown in FIG. 15(b).

When the sequence number exhibits 3, data in the backup areas 1 and 2 saved in S96 is written back into their respective original erasing blocks in S98 as shown in FIG. 15(c).

When the sequence number exhibits 4, data in the backup block is erased completely in S99 as shown in FIG. 15(d).

By the foregoing series of actions, the erasing action for the arbitrary area in the nonvolatile memory 14 is completed.

Next, in S101, the sequence number is cleared to 0 (zero), and the flow proceeds to S102 by way of S94 and S95. In S102, data is written into an erased area (BLOCK D) in the nonvolatile memory 14 of FIG. 15(c). Accordingly, the data overwriting action with respect to the nonvolatile memory 14 is completed (S103).

In the foregoing 1-chip microcomputers 1 and 11, one nonvolatile memory is not used either as a program area into which a program is stored, or a data area into which data is stored or overwritten, but used as the program area and also as the data area simultaneously. The use as the two different areas becomes particularly effective when a nonvolatile memory of a huge capacity is used.

Also, because the nonvolatile memory can be used as the two different areas simultaneously, the IC card assembled by the 1-chip microcomputer 1 or 11 can be downsized by using only one chip.

Further, when the IC card assembled by the 1-chip microcomputer 1 or 11 includes a nonvolatile memory of a huge capacity, a volume of the program or the size of the data area can be changed dynamically. Consequently, the resulting IC card can be quite flexible and at the same time ensures high security. Furthermore, the IC card can realize a multi-application system with which data can be overwritten dynamically.

In other words, the IC cards including a memory of huge capacity to enable multi-application have been proposed, but in practice, the use of these IC cards is limited because the program is still on the ROM. However, by using the 1-chip microcomputer 1 or 11 of the present invention, it has become possible to realize a system such that not only can an application be added or erased dynamically after the IC card is issued, but also the OS can be upgraded.

The microcomputer having a built-in nonvolatile memory of the present invention may be arranged in such a manner to include:

at least one erasable nonvolatile memory;

a boot ROM for storing an initial program to start up the microcomputer and a transfer program to transfer the initial program to the nonvolatile memory; and control means for transferring the initial program to the nonvolatile memory in accordance with the transfer program when the nonvolatile memory stores no program.

Consequently, in the same state as immediately after the manufacturing when no data is stored in the nonvolatile memory, the data can be readily transferred from the boot ROM to the nonvolatile memory to be stored therein.

The microcomputer having a built-in nonvolatile memory is arranged in such a manner that the control means carries out at least one of data writing and data erasing actions with respect to the nonvolatile memory in accordance with the program transferred from the nonvolatile memory to the RAM and stored therein.

According to the above arrangement, at least one of the data writing and data erasing actions can be carried out with respect to the nonvolatile memory by the control means in accordance with the program stored in the RAM. Because these actions are carried out in accordance with the program on the RAM, no adverse effect is given to these actions even if another program is run on the nonvolatile memory.

The microcomputer having a built-in nonvolatile memory is arranged in such a manner that the control means reads out data from a specified area in the nonvolatile memory or RAM and writes the same into a specified area in the nonvolatile memory in accordance with the program stored in the RAM.

According to the above arrangement, data can be read out from a specified area in the nonvolatile memory or RAM and written into a specified area in the non-volatile memory in accordance with the program stored in the RAM. Because this action is carried out in accordance with the program on the RAM, no adverse effect is given to this action even if another program is run on the nonvolatile memory.

The microcomputer having a built-in nonvolatile memory is arranged in such a manner that an interrupt routine program is stored in the nonvolatile memory, and that, when an interrupt occurs while the control means carries out at least one of the data writing and data erasing actions with respect to the nonvolatile memory in accordance with the program stored in the RAM, the control means branches the control to an interrupt routine program stored in the nonvolatile memory in accordance with a head address of the interrupt routine.

According to the above arrangement, when an interrupt occurs while the control means carries out at least one of the data writing and data erasing actions with respect to the nonvolatile memory in accordance with the program stored in the RAM, the control means suspends the routine, and switches the control to an interrupt routine program stored in the nonvolatile memory in accordance with the startine address of the interrupt routine, and carries out the switched control. Consequently, when an interrupt occurs, an interrupt routine can be carried out in an adequate manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microcomputer having a built-in nonvolatile memory comprising:

at least one erasable nonvolatile memory provided in a memory space of said microcomputer;

a boot ROM for storing an initial program to start up said microcomputer and a transfer program to transfer said initial program to said nonvolatile memory;

a RAM;

control means for, when said nonvolatile memory stores no program, transferring said initial program to said nonvolatile memory in accordance with said transfer program, and subsequently removing said boot ROM from the memory space of said microcomputer, wherein:

said nonvolatile memory stores a transfer program to transfer a program stored in said nonvolatile memory to said RAM; and said control means for carrying out a program stored in said RAM, transferring the program stored in the nonvolatile memory to the RAM in accordance with said transfer program, and when carrying out the program stored in said RAM, moving a starting address of an interrupt routine program included in said initial program from said nonvolatile memory to said RAM.

2. The microcomputer having a built-in nonvolatile memory of claim 1, wherein:

said nonvolatile memory has a capacity to store both a program and data;

a program to issue a command to use the data area, where data is stored, in the same nonvolatile memory is stored in said program area, where a program is stored; and said control means uses the data area to store data in accordance with said program.

3. The microcomputer having a built-in nonvolatile memory of claim 1, wherein:

said control means for carrying out at least one of data writing and data erasing actions with respect to said nonvolatile memory in accordance with the program transferred from said nonvolatile memory to said RAM and stored therein.

4. The microcomputer having a built-in nonvolatile memory of claim 3, wherein:

an interrupt routine program is stored in said nonvolatile memory; and the program transferred from said nonvolatile memory to said RAM and stored therein includes, in addition to a writing/erasing program to carry out at least one of data writing and data erasing actions with respect to said nonvolatile memory, a suspending routine program of said writing/erasing program, a branching routine program for said interrupt routine program, and a resuming routine program to resume said writing/erasing program.

5. The microcomputer having a built-in nonvolatile memory of claim 1, wherein:

said control means for reading out data from a specified area in one of said nonvolatile memory and RAM and writing read-out data into a specified area in said nonvolatile memory.

6. The microcomputer having a built-in nonvolatile memory of claim 1, wherein:

when an interrupt occurs while said control means carries out at least one of data writing and data erasing actions with respect to said nonvolatile memory in accordance with the program stored in said RAM, said control means for branching a control to an interrupt routine program stored in said nonvolatile memory in accordance with a starting address of said interrupt routine program.

7. The microcomputer having a built-in nonvolatile memory of claim 6, wherein:

said control means for disabling any interrupt while the program stored in said RAM is run.

8. The microcomputer having a built-in nonvolatile memory of claim 1, wherein said nonvolatile memory is a flash memory.

9. The microcomputer having a built-in nonvolatile memory of claim 1, wherein said nonvolatile memory is an EEPROM.

10. The microcomputer having a built-in nonvolatile memory of claim 1, wherein said nonvolatile memory is a FeRAM.

11. A microcomputer having a built-in nonvolatile memory comprising:

a RAM;

at least one erasable nonvolatile memory for, provided in a memory space of said microcomputer, storing a starting address of an interrupt routine program, and a transfer program for transferring a first program having been stored therein to said RAM; and control means for carrying out a program stored in said RAM, and transfers said first program from said nonvolatile memory to said RAM in accordance with said transfer program, and when said first program stored in said RAM is run, moves a starting address of said interrupt routine program onto said RAM from said nonvolatile memory.

12. The microcomputer having a built-in nonvolatile memory of claim 11, wherein:

a program area and a data area are set on a same nonvolatile memory;

a second program to issue a command to use said data area on the same nonvolatile memory is stored in said program area; and said control means uses said data area for data storage in accordance with said second program.

13. The microcomputer having a built-in nonvolatile memory of claim 11, wherein:

said control means for carrying out at least one of data writing and data erasing actions with respect to said nonvolatile memory in accordance with a program transferred from said nonvolatile memory to said RAM and stored therein.

14. The microcomputer having a built-in nonvolatile memory of claim 13, wherein:

an interrupt routine program is stored in said nonvolatile memory; and the program transferred from said nonvolatile memory to said RAM and stored therein includes, in addition to a writing/erasing program to carry out at least one of data writing and data erasing actions with respect to said nonvolatile memory, a suspending routine program of said writing/erasing program, a branching routine program for said interrupt routine program, and a resuming routine program to resume said writing/erasing program.

15. The microcomputer having a built-in nonvolatile memory of claim 11, wherein:

said control means for reading out data from a specified area in one of said nonvolatile memory and RAM and for writing read-out data into a specified area in said nonvolatile memory in accordance with a program stored in said RAM.

16. The microcomputer having a built-in nonvolatile memory of claim 11, wherein:

when an interrupt occurs while said control means carries out at least one of data writing and data erasing actions with respect to said nonvolatile memory in accordance with a program stored in said RAM, said control means for branching a control to an interrupt routine program stored in said nonvolatile memory in accordance with a starting address of said interrupt routine program.

17. The microcomputer having a built-in nonvolatile memory of claim 16, wherein:

said control means for disabling any interrupt of other jobs while a program stored in said RAM is run.

18. The microcomputer having a built-in nonvolatile memory of claim 11, wherein said nonvolatile memory is a flash memory.

19. The microcomputer having a built-in nonvolatile memory of claim 11, wherein said nonvolatile memory is an EEPROM.

20. The microcomputer having a built-in nonvolatile memory of claim 11, wherein said nonvolatile memory is a FeRAM.

* * * * *